United States Patent [19]

Sano et al.

[11] 3,893,174

[45] July 1, 1975

[54] COLOUR TELEVISION RECEIVER

[75] Inventors: Shunichi Sano, Zama; Koichi Kasahara, Yokohama, both of Japan; Harry C. Murphy, Jr., Apollo; Harry C. Stauffer, Cheswick, both of Pa.

[73] Assignee: Tokyo Shibaura Electric Co., Ltd., Kawasaki, Japan

[22] Filed: June 28, 1973

[21] Appl. No.: 374,311

[30] Foreign Application Priority Data

| | | |
|---|---|---|
| July 1, 1972 | Japan | 47-65417 |
| Aug. 29, 1972 | Japan | 47-85894 |
| Sept. 11, 1972 | Japan | 47-90448 |
| Sept. 11, 1972 | Japan | 47-90449 |
| Oct. 25, 1972 | Japan | 47-106219 |
| Oct. 30, 1972 | Japan | 47-107918 |
| Dec. 21, 1972 | Japan | 47-127717 |

[52] U.S. Cl. .................... 358/65; 208/210; 208/143

[51] Int. Cl. ........................ H04n 9/20; C10G 23/02

[58] Field of Search .......... 178/5.4 R, 5.4 M, 5.2 D; 358/60, 63, 65

[56] References Cited

UNITED STATES PATENTS

| | | | |
|---|---|---|---|
| 3,189,540 | 6/1965 | Kozlowski et al. | 208/89 |
| 3,682,813 | 8/1972 | Dun et al. | 208/89 |
| 3,708,616 | 1/1973 | Von Felgel | 178/5.4 M |
| 3,720,782 | 3/1973 | Kaminski et al. | 178/5.2 D |
| 3,728,250 | 4/1973 | Hass et al. | 208/89 |
| 3,801,494 | 4/1974 | Moore et al. | 208/89 |

*Primary Examiner*—Richard Murray
*Attorney, Agent, or Firm*—Flynn & Frishauf

[57] ABSTRACT

In a colour television receiver wherein three electron beams respectively modulated by red, green and blue video signals are simultaneously deflected to display on a fluorescent screen a composite picture image of three colour picture images, there is provided a time axis converter for compressing, expanding or delaying with respect to time the image signal adapted to modulate at least one electron beam in one horizontal scanning period for different intervals so as to accurately superposing each other the multi-colour picture images over the entire surface of the fluorescent screen thus forming a multi-colour composite picture image free from any misalignment.

15 Claims, 93 Drawing Figures

72, 73, 74 : SIGNAL TREATING CIRCUIT 76, 77, 78 : DRIVER CIRCUIT 79, 80, 81 : VIDEO AMP

FIG.28A, FIG.28B, FIG.28C, FIG.28D, FIG.28E, FIG.28F, FIG.28G, FIG.28H, FIG.28I, FIG.28J, FIG.28K, FIG.28L, FIG.28M, FIG.28N, FIG.28O, FIG.28P, FIG.28Q, FIG.28R, FIG.28S, FIG.28T, FIG.28U 72, 73, 74 : SIGNAL TREATING CIRCUIT
76, 78 : DRIVER
79, 80, 81 : VIDEO AMP

COLOUR TELEVISION RECEIVER

This invention relates to an apparatus for exactly superposing images bearing a plurality of colours used with a colour television receiver.

With a colour television receiver using a shadow mask type colour cathode ray tube, three electron beams should concentrate at every point on the shadow mask in order to obtain a good synthesized colour image free from colour displacement. To this end, the customary practice is to vary the traveling causes of the respective electron beams by means of a permanent magnet as well as by an electromagnetic coil for static and dynamic convergence of the synthesized colour image.

The above-mentioned customary process can indeed attain a relatively good convergence of electron beam in the central portion of a synthesized colour images. In the peripheral portion of said colour image, however, the three electron beams take different traveling courses, presenting difficulties in effecting their exact convergence. This undesirable event becomes prominent particularly in the case of a colour cathode ray tube having a broader deflection angle than 110°, consuming a larger amount of power in attaining proper convergence. Further, an increased amount of correction causes the three electron beams to be brought into the shadow mask at more varied incidence angle. Accordingly, correction of a synthesized colour image should be carried out at more than ten places to realize the exact convergence of the three electron beams and the colour purity of colour image, raising very difficult practical problems.

A proposed process of superposing three colour images on a fluorescent screen without changing the traveling courses of the three electron beams consists in emitting parallel electron beams from an electron gun assembly on to the fluorescent screen without any inclination; first providing three separate images bearing different colours and displaced to the prescribed extent corresponding to the intra-electron beam interval; and then shifting the positions of two colour images in parallel to the position of a foremost colour image in accordance to the intra-electron beam interval by delaying said two colour images in succession by a length of time determined by an amount of the aforesaid displacement and the scanning speed of the electron beams. Namely, this process delays to the prescribed extent colour image signals for modulating electron beams forming the two colour images subjected to the aforesaid parallel shifting in accordance with the interval between the electron beams forming said parallel shifted colour images and the electron beam providing the foremost referential colour image.

The above-mentioned proposed process indeed has a certain effect with respect to a colour television receiver having a relatively small deflection angle. With a colour television receiver having a broader deflection angle than 110°, however, the distances between the deflection center and various points on the fluorescent screen may sometimes display wide differences, causing the three colour images to be prominently displaced nonlinearly in the peripheral portion of a synthesized colour image. Therefore, mere delay of the electron beams by colour image signals to a fixed extent fails to attain the exact superposition of three separate colour images over their entire areas.

It is accordingly the object of this invention to provide a colour television receiver wherein there can be obtained a synthesized colour image by exactly superposing separate colour images bearing the three primary colours of colour television uniformly over their entire areas.

According to an aspect of this invention, there is provided a colour television receiver displaying a synthesized image bearing the three primary red, green and blue colours on a fluorescent screen by three electron beams modulated by video signals denoting said red, green and blue colours, wherein a video signal for modulating at least one of the three electron beams is subjected to any of the compression, extension and delay processes in terms of time; and a synthesized image is displayed on the fluorescent screen by superposing three separate colour images with any or more of the above-mentioned processes repeated in different amounts during one period of horizontal scanning.

Further objects and advantages of the invention can be more fully understood from the following detailed description taken in conjunction with the accompanying drawings, in which.

Figure 1:
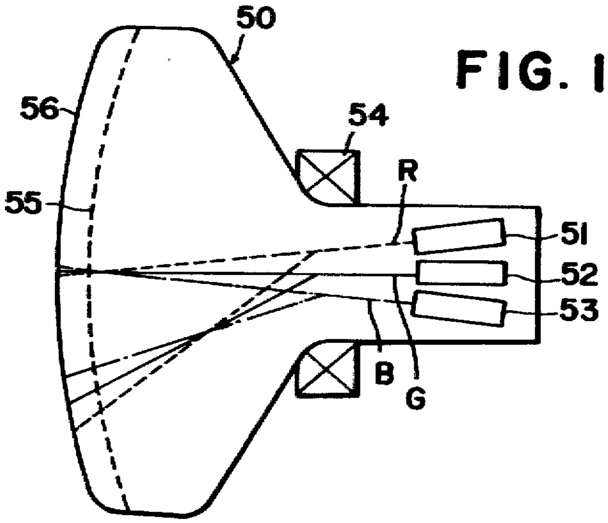
FIG. 1 is a diagram showing the construction of a shadow mask type colour picture tube incorporated with an in-line type three electron gun assembly constructed in accordance with this invention.

The shadow mask type colour television tube 50 shown in FIG. 1 comprises three electron guns 51, 52 and 53 for red, green and blue colours which are arranged in-line. The electron beams R, G and B emanated from these electron guns are deflected simultaneously by a deflection coil 54 and the deflected electron beams R, G and B transmit through the slits of a shadow mask 55 to impinge upon a fluorescent screen 56 formed on the inner surface of the face plate of the tube thereby causing red, green and blue phosphor dots to selectively luminesce. Although the tube is designed to focus three electron beams R, G and B at the slits of the shadow mask 55 it is difficult to accurately focus three electron beams over the entire surface of the shadow mask 55 due to inaccurate assembly of three electron guns 51, 52 and 53 or due to distortion of the magnetic field produced by the deflection coil 54. For example, if the beams could be accurately focused at the central portion of the shadow mask by using a static convergence apparatus, not shown, when deflected by the deflection coil, the beams would be focused at different points. In the in-line type colour picture tube, as three electron guns 51, 52 and 53 are arranged in-line in the direction of the horizontal scanning, the misalignment of the focused electron beams occurs essentially in the horizontal direction. Such horizontal misalignment differs from point to point and also differs for respective electron beams R, G and B.

Figure 2:
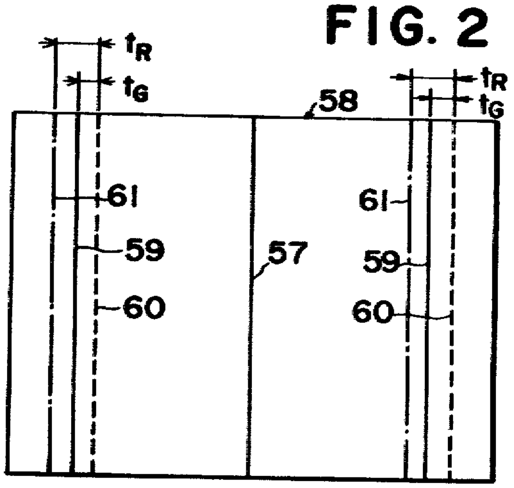
FIG. 2 is a diagram adapted to explain the misalingment or distortion of picture images occurring in the colour picture tube shown in FIG. 1.

FIG. 2 is a diagram showing the horizontal displacement of a vertical line picture image of a colour picture tube constructed such that where the electron beams R, G and B are not subjected to the action of the deflection coil, they will be displayed as a single line 57 at the center by the action of a static convergence apparatus, not shown. More particularly, as the signals supplied to electron guns 51, 52 and 53 are constructed to accurately align the focal points of the electron beams at the central portion of the picture 58, the picture reproduced under these conditions would form misalignment of colours at the opposite sides of the picture 58 as shown in FIG. 2. Such misalignment is caused by the fact that electron beams R, G and B arrive at different positions on the fluorescent screen 56 at the same time. On the lefthand end of the picture 58, a blue line 60 is formed by electron beam B at a position to the right of a line 59 formed by electron beam G for green at a distance corresponding to an interval tG, and a red line 61 is formed by electron beam R at a position to the left of blue line 60 at a distance corresponding to an interval tR. Similarly, three lines 59, 60 and 61 having the same relative position also appear on the righthand end of the picture.

Figure 3:
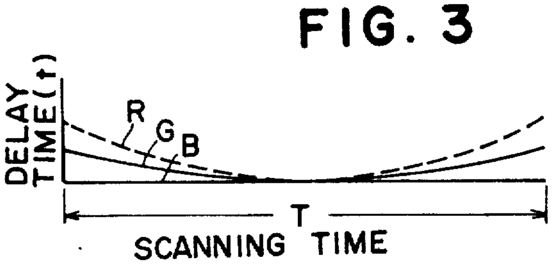
FIG. 3 is a diagram showing the distortion of the picture images in terms of time delay of red and green signals during one scanning period taking the blue video signal as the reference.

FIG. 3 shows the time difference of the pictures formed by electron beams R and G with reference to the picture formed by electron beam B which is taken as the reference. As can be noted from FIG. 3, if the static convergence device is constructed such that three pictures formed by electron beams R, G and B coincide with each other at the central portion of the picture red and green pictures displace symmetrically with respect to red picture on both ends of the picture.

Figure 4:
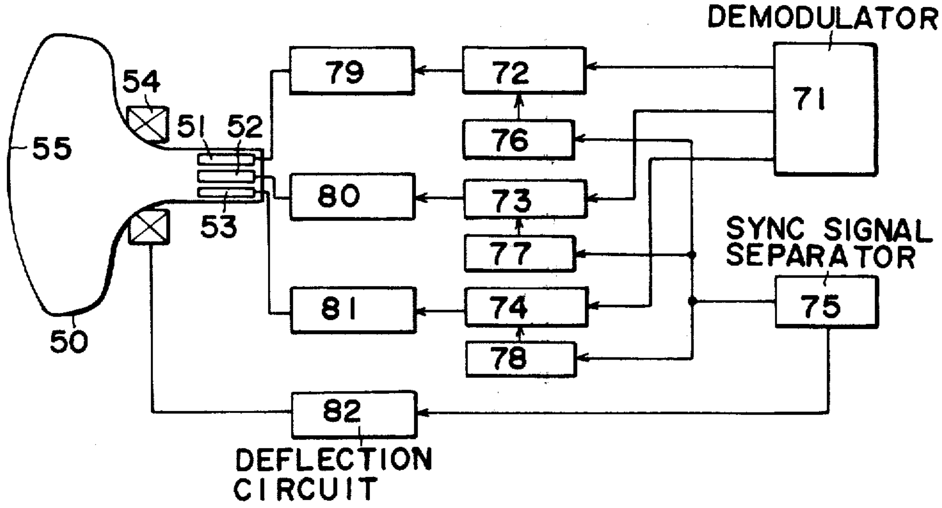
FIG. 4 is a block diagram useful to explain the principle of the invention.

FIG. 4 is a block diagram of a circuit utilized to compensate for the distortion of the picture image produced by a colour television receiving set in which the red, green and blue signals demodulated by a primary colour signal demodulator 71 are applied to signal time axis converting circuits 72, 73 and 74, respectively, which are driven by drive circuits 76, 77, 78, respectively for subjecting the video signal to at least one of compression, elongation and delay corresponding to the amount of misalignment of the electron beams on respective positions on the fluorescent screen with reference to the horizontal synchronizing signal produced by a synchronous separating circuit. The video signals processed in this manner are amplified by video amplifiers 79, 80 and 81, respectively and then impressed upon electron guns 51, 52 and 53 respectively. The electron beams emanated from these electron guns are deflected to scan the fluorescent screen 55 by the deflection field generated by deflection coil 54 which is driven by the output from deflection drive circuit 82.

With this arrangement, it is possible to reproduce satisfactory colour picture images without any colour misalignment and without using any dynamic convergence device. Furthermore, when a static convergence device is also not used all three colour beam signals should be subjected to compression, elongation and delay by using drive circuits 76, 77 and 78. Since this construction eliminates the space for mounting the convergence device on the neck of the colour picture tube, it is possible to decrease the length of the tube.

Although in the foregoing description, the invention has been applied to an in-line type shadow mask colour picture tube it will be clear that the invention is also applicable to a colour picture tube in which three electron guns are disposed in delta or to a two or three phenomena oscilloscope for displaying the phenomena with two or three electron beams.

Figure 5:
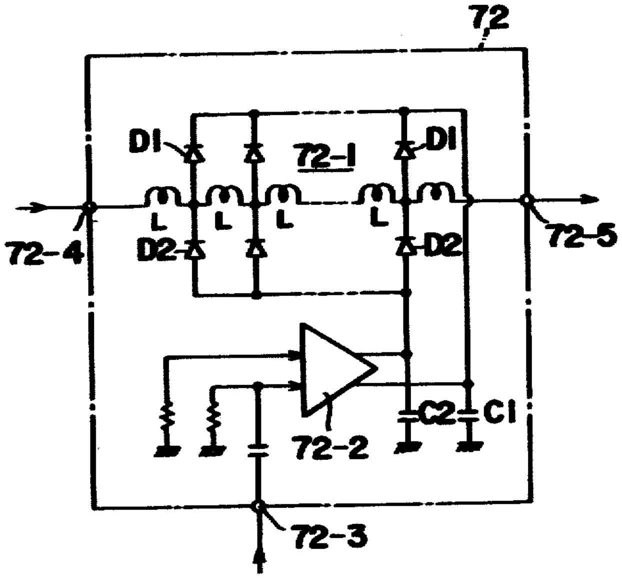
FIG. 5 is a connection diagram showing one example of the time axis converting device utilized in the circuit shown in FIG. 4.

The time axis converters 72, 73 and 74 shown in FIG. 4 may be formed by using a voltage controlled time delay line as shown in FIG. 5. Thus, for example, the time axis converter 72 may comprise a voltage controlled type delay line 72-1 in which the capacitance element of an ordinary LC lumped constant type delay line is replaced by a variable capacitance type diode. The delay line 72-1 comprises a plurality of serially connected inductance coils L, a first group of variable capacitance diodes D1 with their anode electrodes connected to respective junctures between adjacent inductance coils and their cathode electrodes connected in common, and a second group of variable capacitance diodes D2 with their cathode electrodes connected to respective junctures between adjacent inductance coils and their anode electrodes connected in common. Commonly connected cathode electrodes of diodes D1 are grounded through a capacitor C1 and are connected to one output of a differential amplifier 72-2, whereas the commonly connected anode electrodes of diodes D2 are connected to the ground through a capacitor C2 and to the other output of the differential amplifier 72-2. A control signal voltage corresponding to the extent of misalignment of the positions on the fluorescent screen on which three electron beams collide is applied to the input terminal 72-3 of the differential amplifier 72-2 from drive circuit 76, the amplified control signal voltage being impressed across the cathode electrode of variable capacitance diode D1 and the anode electrode of the variable capacitance diode D2. In this manner the red signal supplied to terminal 72-4 from demodulator 71 is delayed in accordance with the output from the differential amplifier 72-2 and the delayed red signal is applied to electron gun 51 via output terminal 72-5.

Figure 6A:
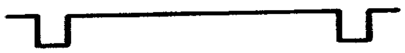
FIGS. 6A to 6D are waveforms of the signals useful to explain the operation of the circuit shown in FIG. 5.
Figure 6B:
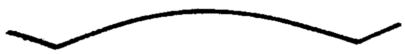
Figure 6C:
Figure 6D:

The drive circuits 76, 77 and 78 function to perform twice integration of the horizontal synchronizing pulse or horizontal oscillation pulse shown in FIG. 6A from synchronous separating circuit 75 so as to form a voltage in the form of a parabola. If desired, this parabolic voltage may be converted into a control signal voltage shown in FIG. 6B and corresponding to the extent of the misalignment of the respective positions on the fluorescent screen by subjecting the parabolic voltage to amplitude modulation of a parabolic signal having a vertical scanning period. The control signal shown in FIG. 6B is applied to the differential amplifier via input terminal 72-3 shown in FIG. 5 to obtain differential output control voltages as shown in FIGS. 6C and 6D which are impressed across the variable capacitance diodes D1 and D2 to operate as reverse bias potentials, thus varying the junction capacitances of these diodes. Accordingly, the time necessary for the red signal applied to input terminal 72-4 to pass through the delay line 72-1 is varied, whereby a red signal subjected to such time axis conversion processings as compression, elongation or delay corresponding to the extent of misalignment of the respective positions of the fluorescent screen will appear at the output terminal 72-5. The other time axis converting circuits 73 and 74 are constructed similarly.

Figure 7:
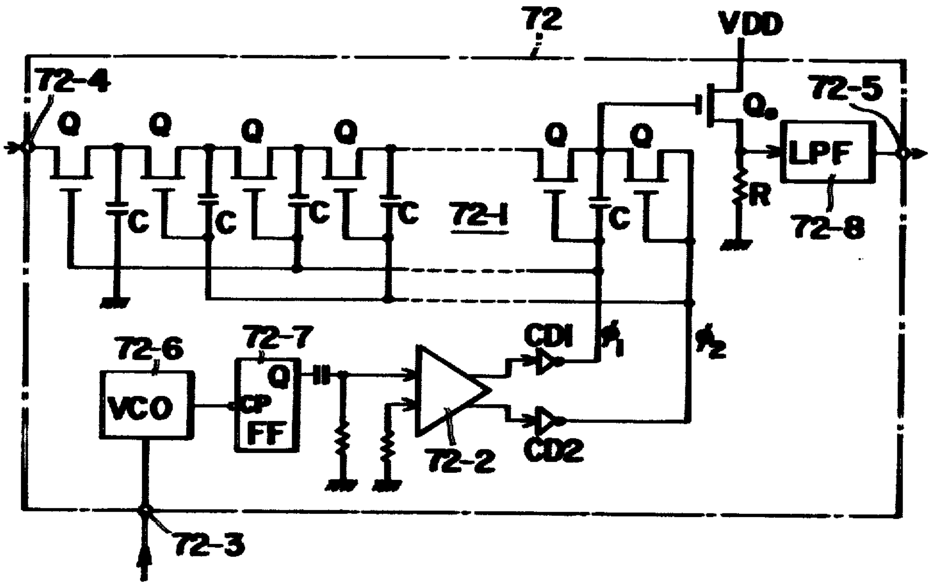
FIG. 7 is a connection diagram showing a modified time axis converting device.
Figure 8A:
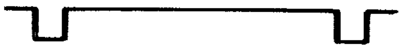
FIGS. 8A to 8F are waveforms of the signals useful to explain the operation of the circuit shown in FIG. 7.
Figure 8B:
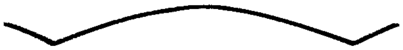
Figure 8C:
Figure 8D:
Figure 8E:
Figure 8F:

As shown in FIG. 7, it is also possible to compose the delay circuit 72-1 of the time axis converting circuit 72 of a bucket brigade device (BBC). The device comprises a plurality of serially connected field effect transistors Q and an analogue shift register including capacitors C and an output transistor Q0 and is supplied with the output from the differential amplifier 72-2 via clock drivers CD1 and CD2. Thus, the shift register is driven by two phase clock pulses $\phi1$ and $\phi2$ supplied from the differential amplifier 72-2 through clock drivers CD1 and CD2. The frequencies of the clock pulses may be controlled dependent upon the extent of misalignment of the respective positions on the fluorescent screen, thereby affording a time axis conversion processing similar to that described in connection with FIG. 5. More particularly, in each of the drive circuits 76, 77 and 78, the horizontal synchronizing pulse or the horizontal oscillation pulse shown in FIG. 8A is converted into a parabolic voltage. If desired, this parabolic voltage may be amplitude modulated with a parabolic signal having a vertical scanning period so as to form a control signal voltage as shown in FIG. 8B and corresponding to the extent of misalignment of respective positions on the fluorescent screen. The control signal voltage shown in FIG. 8B is applied to a voltage controlled type oscillator (VCO) 72-6 via a signal input terminal shown in FIG. 7. The purpose of VCO is to generate a clock pulse for BBD, and the oscillation output signal from VCO is controlled by the control signal shown in FIG. 8B to be frequency modulated as shown in FIG. 8C, for instance. The output from VCO is used to drive a flip flop circuit 72-7 to obtain an output signal having a rectangular waveform as shown in FIG. 8D, which is applied to the differential amplifier 72-2 to obtain rectangular signals of the opposite polarity as shown in FIGS. 8E and 8F. These signals are used to drive BBD respectively through clock drivers CD1 and CD2. As a result, the time required by a signal of primary colour, for example red signal applied to input terminal 72-4 to pass through BBD is controlled by the control signal whereby a colour signal subjected to such time axis conversion processing as compression, elongation and delay corresponding to the extent of misalignment at respective positions on the fluorescent screen will appear at the output terminal 72-5. In FIG. 7, a low-pass filter (LPF) 72-8 is used for the purpose of eliminating the frequency components of the clock pulse. Although the frequency of the clock pulse can also be controlled by the control signal, care should be taken to ensure that the lowest frequency should be more than twice of the highest frequency of the signal of the primary colour. In this case, the frequency fcp(t) of the clock pulses $\phi1$ and $\phi2$ must be determined to satisfy the following equation.

$$N = \int_t^{t+Td(t)} fcp(t)dt \quad (1)$$

where N is bit numbers of the BBD and $Td(t)$ is misalignment at respective positions on the fluorescent screen.

Figure 9:
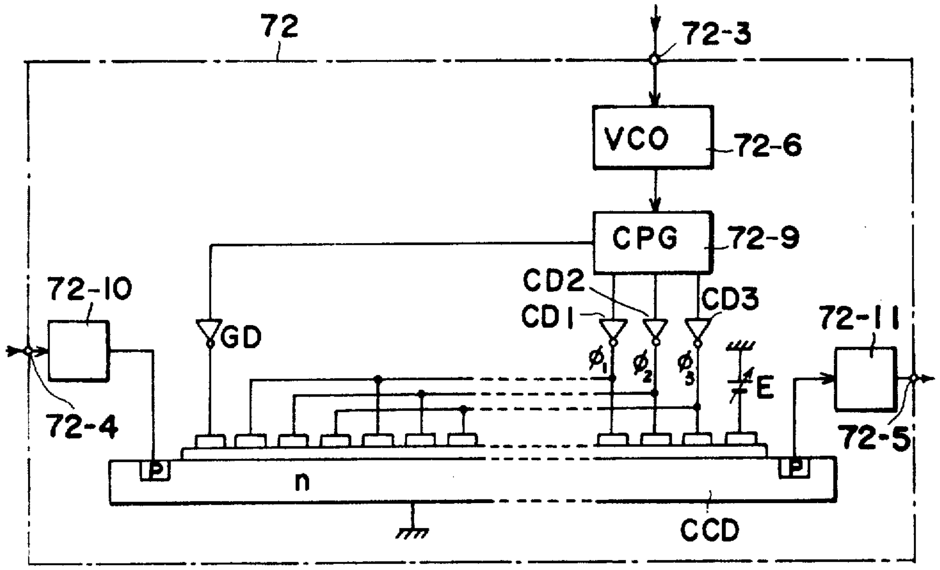
FIG. 9 shows a block diagram of another modification of the time axis converting device.

Furthermore, each of the time axis conversion circuits 72, 73 and 74 may be formed of a charge coupled device (CCD) as shown in FIG. 9 and functioning as an analogue shift register like BBC. Although there are two phase drive type and three phase drive type CCD, a three phase drive type P-channel CCD is illustrated in FIG. 9. In the circuit shown in FIG. 9, the control signal from VCO 72-6 is applied to a three phase clock pulse generator (CPG) 72-9 and the output thereof is applied to an input gate driver GD and to clock drivers CD1, CD2 and CD3. A reference letter E designates a source of an output gate bias voltage.

A control signal as shown in FIG. 8B has been produced in accordance with the extent of misalignment of the respective positions on the fluorescent screen is applied to the voltage controlled oscillator 72-6 via input terminal 72-3 to frequency modulate the output of VCO 72-6 with the control signal. This frequency modulated output signal from VCO 72-6 is used in the clock pulse generator 72-9 to form three phase clock pulses for driving CCD and an input gate pulse which are applied to CCD to drive the same through clock drivers CD1, CD2, CD3 and gate driver GD. On the other hand, the primary colour signal applied to input terminal 72-4 is impressed upon CCD via input circuit 72-10 and is transferred sequentially by the three phase clock pulses $\phi 1$, $\phi 2$ and $\phi 3$ to appear on the output terminal 72-5 via output circuit 72-11. Although not shown in the drawing, the output circuit 72-11 contains a lowpass filter for eliminating the clock frequency component and an amplifier similar to that shown in FIG. 7. Since the signal appearing at the output terminal 72-5 represents the primary colour signal received at the input terminal 72-4 and subjected to such time axis conversion processing as compression, elongation and delay corresponding to the extent of the misalignment at respective positions on the fluorescent screen because clock (transfer) pulse of CCD has been frequency modulated with the control signal. In the case of a CCD, the lowest clock (transfer) frequency is set to be more than twice of the maximum frequency of the primary colour signal.

In this case, it is also necessary to determine the frequency $fcp(t)$ of clock pulses $\phi 1$, $\phi 2$ and $\phi_3$, the bit numbers of CCD, and $Td(t)$ to satisfy the equation (1).

It is also possible to form the time axis conversion circuit with a digital shift transistor, in which case an analogue-digital converter is added to the input side, and a digital-analogue converter is added to the output side. The time axis conversion circuit can also be constituted by a surface wave device. Since the surface wave device can not pass direct current it is necessary to use a carrier wave, but it is possible to readily perform the desired time axis conversion processing by modulating the frequency of the carrier wave with the control signal.

Figure 10:
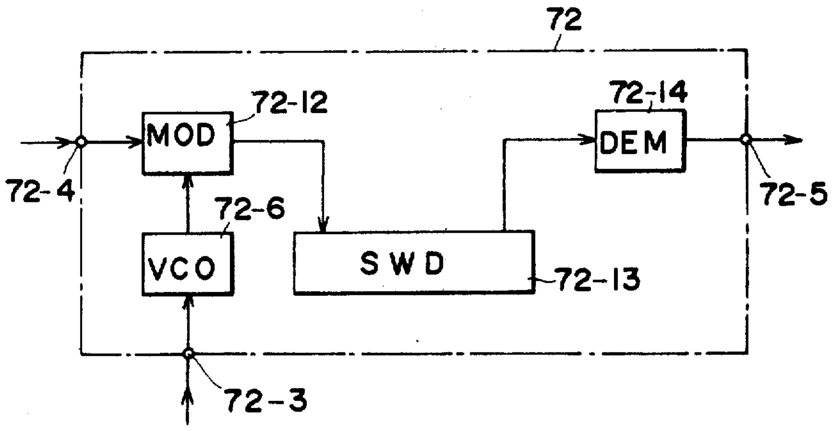
FIG. 10 shows a block diagram of still another modification of the time axis converting device.

One example of a time axis conversion circuit utilizing a surface wave device is illustrated in FIG. 10 in which a control signal as shown in FIG. 8B is impressed upon input terminal 72-3 for the purpose of controlling the oscillation frequency of the voltage controlled type oscillator VCO. The output from the oscillator VCO is applied to a modulator MOD in which the output is amplitude modulated by the primary colour signal impressed upon input terminal 72-4 and the modulated signal is applied to the input terminal of a surface wave device 72-13 to transmit therethrough to reach output terminal. The amplitude modulated signal is then demodulated by a demodulator (DEM) 72-14 to produce a demodulated signal at the output terminal 72-5. Since the carrier wave has been frequency modulated by the control signal, the primary colour signal which has been applied to input terminal 72-4 and subjected to such time axis conversion processing as compression, elongation and delay in accordance with the extent of misalignment of the respective positions on the fluorescent screen will appear at the output terminal.

Figures 11, 12:
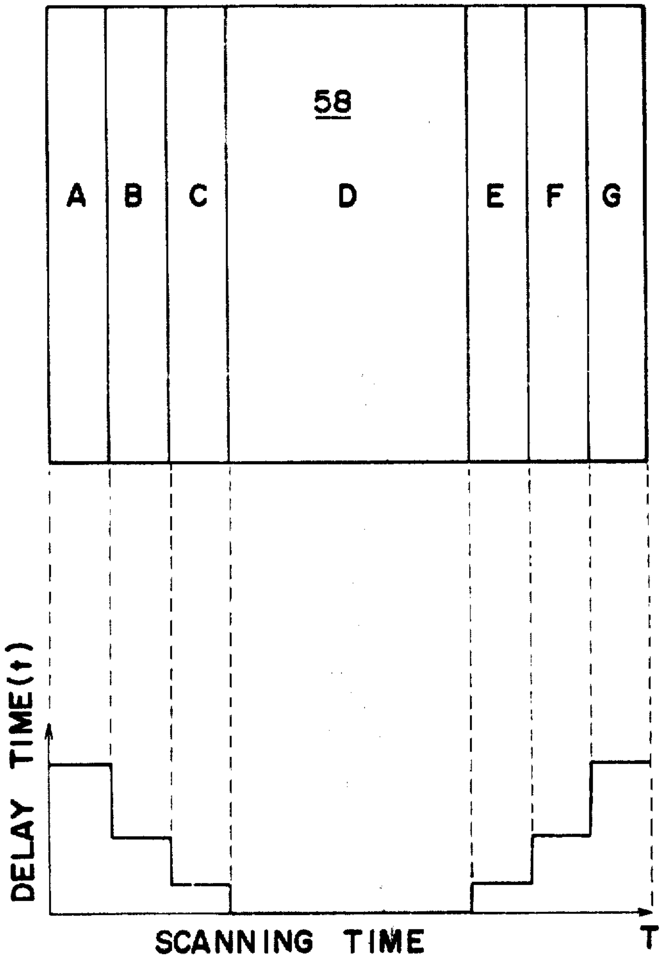
FIG. 11 is a diagram showing a television picture divided in accordance with the magnitude of the distortion.
FIG. 12 is a diagram showing the degree of time delay in respective divided regions shown in FIG. 11.

Although in the above described embodiments, the distortion compensation has been made continuously in the horizontal direction, it has been confirmed by experiment that an effective compensation can also be provided by dividing the picture into a plurality of (for example, 7) regions A, B . . . G in the horizontal scanning direction as shown in FIG. 11 and by varying stepwisely the delay time in the seven regions as shown in FIG. 12.

Figure 13:
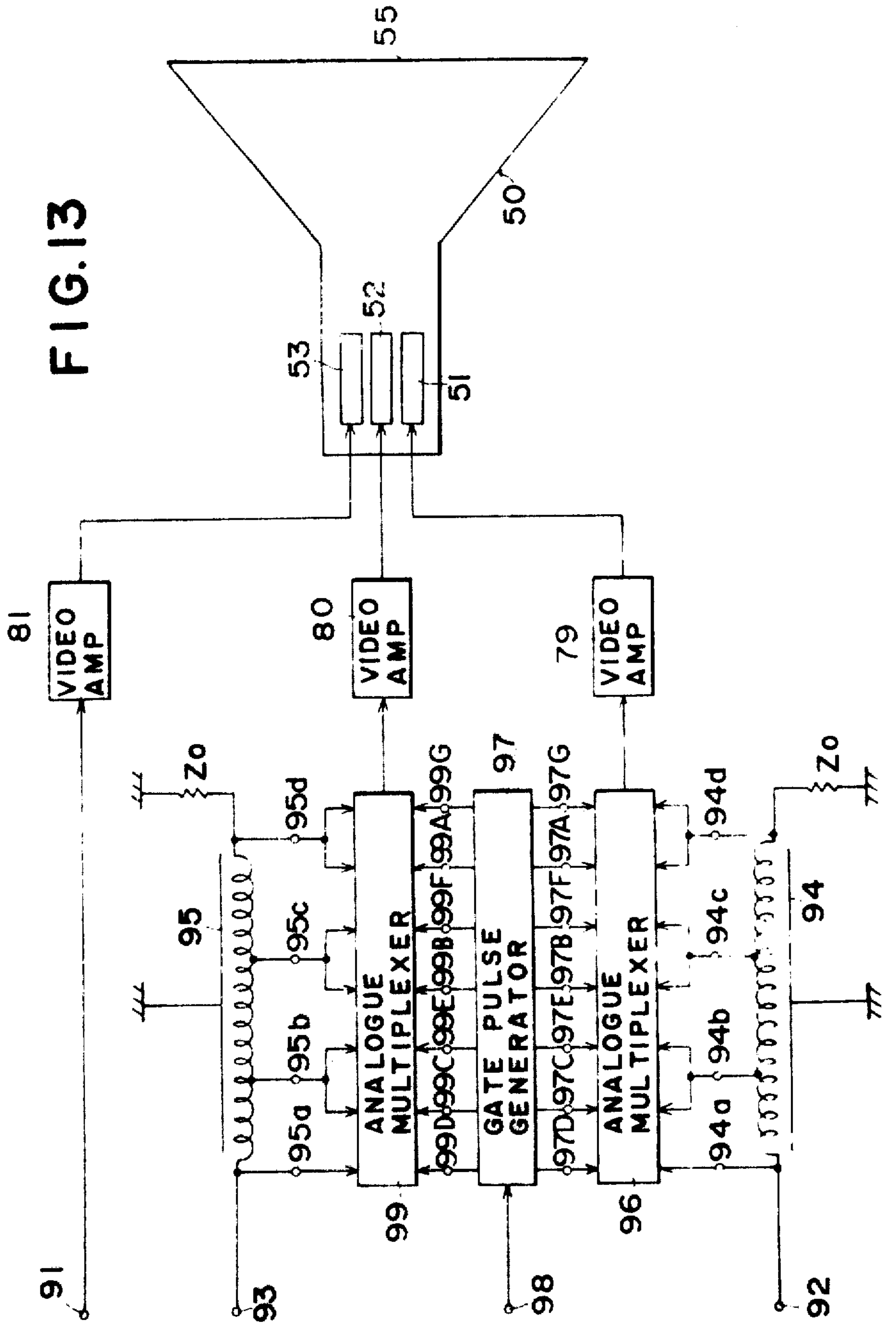
FIG. 13 is a block diagram showing a modified embodiment of this invention.

FIG. 13 illustrates a modified embodiment based on this concept in which the picture images formed by red and green electron beams are corrected into alignment with the picture image formed by electron beam B which is modulated by the blue signal. More particularly, the blue signal impressed upon a blue signal input terminal 91 is amplified by an image amplifier 81 and is then impressed upon a blue electron gun 53 of a colour picture tube 50. Red and green signals are applied to one terminals of delay lines 94 and 95 through input terminals 92 and 93, respectively. the opposite terminals of delay lines 94 and 95 being terminated with characteristic impedances Z0, respectively. Delay lines 94 is provided with four taps 94*a*, 94*b*, 94*c* and 94*d*. The tap 94*a* is connected directly to one input of an analogue multiplexer 96, while taps 94*b*, 94*c* and 94*d* are connected to the analogue multiplexer 96 respectively through branched circuits. The analogue multiplexer 96 is connected to receive gate pulses from a gate pulse generator 97 via seven output terminals 97A to 97G. The gate pulse generator 97 is connected to receive a horizontal scanning signal at its input terminal 98 and apply to such timing gate signals to the analogue multiplexer 96 via output terminals 97A to 97G that ensure time delays as shown in FIG. 12 for the regions A to G shown in FIG. 11. Consequently, the red signal impressed upon terminal 92 is divided into seven regions A to G shown in FIG. 11 and the red signal is modified in the analogue multiplexer 96 by the timing gate pulses such that respective regions are delayed by the delay line 94 with delay times shown in FIG. 11. The resulting modified signal is applied to an image amplifier 79 whereby the red picture will be reproduced on the fluorescent screen 55 in exact coincidence with the blue picture without any distortion.

Also the green signal impressed upon input terminal 93 is applied to analogue multiplexer 99 via taps 95*a*, 95*b*, 95*c* and 95*d* of delay line 95 to be controlled by the gate pulses supplied through terminals 99A to 99G. The output video signal from analogue multiplexer 99 is supplied to electron gun 52 via a video amplifier 80 for the green signal.

Figure 14A:
FIGS. 14A to 14I show signal waveforms for explaining the operation of the embodiment shown in FIG. 13.
Figure 14B:
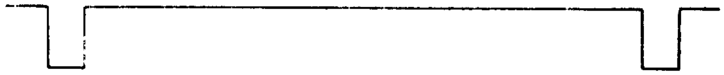
Figure 14C:
Figure 14D:
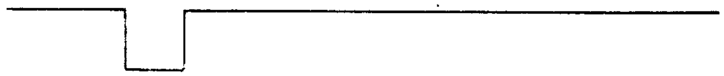
Figure 14E:
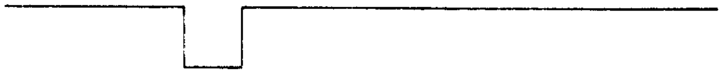
Figure 14F:
Figure 14G:
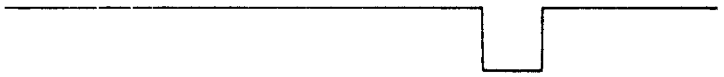
Figure 14H:
Figure 14I:
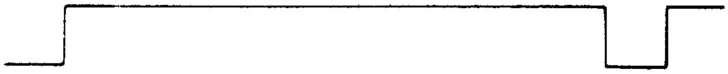

The operation of the circuit shown in FIG. 13 2ill be described in more detail with reference to FIGS. 14A to 14I. As shown in FIGS. 11 and 12, at the central portion D of the picture, respective beams R, G and B can be precisely aligned each other by static convergence compensation, for example. In the presently utilized colour picture tubes, the misalignments at peripheral regions A, B, C and E, F, G are symmetrical with respect to the central region D. In the embodiment shown in FIG. 13, since the blue picture is taken as the reference, the blue picture will be on the rightmost side of the picture. The signals derived out from taps 94*a* and 95*b*, FIG. 13, are to be displayed in the central region shown in FIG. 11, and these signals are subjected to the action of the static convergence but not delayed. Taps 94*b* and 95*b* provide signals to be displayed in regions C and E respectively, taps 94*c* and 95*c* provide signals to be displayed in regions B and F, respectively and taps 94*d* and 95*d* provide signals to be displayed in regions A and G, respectively. The positions of these taps are determined dependent upon the quantities of misconvergences or misalignments in respective regions so as to produce signals respectively delayed by desired intervals. A horizontal synchronizing pulse shown in FIG. 14B is applied to terminal 98. Such horizontal synchronizing signal can be produced by locking a horizontal synchronizing signal produced by the synchronous separating circuit 75 shown in FIG. 4 and shown in FIG. 14A. The video signals supplied to the analogue multiplexers 96 and 97 respectively from taps 94*a*–94*d* and taps 95*a* –95*d* are sequentially and selectively read out by supplying seven gate pulses having waveforms shown in FIGS. 14C to 14I and generated by the gate pulse generator 97. The widths of these gate pulses are determined to correspond to respective regions A to G shown in FIG. 11. The red video signal is sequentially read out from the output of the analogue multiplexer 96 from the beginning of the horizontal scanning in the order of 94*d*, 94*c*, 94*b*, 94*a*, 94*b*, 94*c* and 94*d*, while the green video signal is sequentially read out from the output of the analogue multiplexer 99 from the beginning of the horizontal scanning in the order of 95*d*, 95*c*, 95*b*, 95*a*, 95*b*, 95*c* and 95*d*. The time delay of these video signals is controlled in accordance with the amount of misconvergences in respective regions A to G shown in FIG. 11 and is applied to electron guns 51 to 53 via video amplifiers 79 and 80 together with the green signal. Accordingly, it is possible to reproduce three colour pictures which are well converged over the entire surface of the fluorescent screen 55.

In this embodiment, as the misalignments in the horizontal direction of the picture at the end regions thereof are symmetrical with respect to the central region, it is possible to decrease the number of taps of delay lines 94 and 95.

Figure 15:
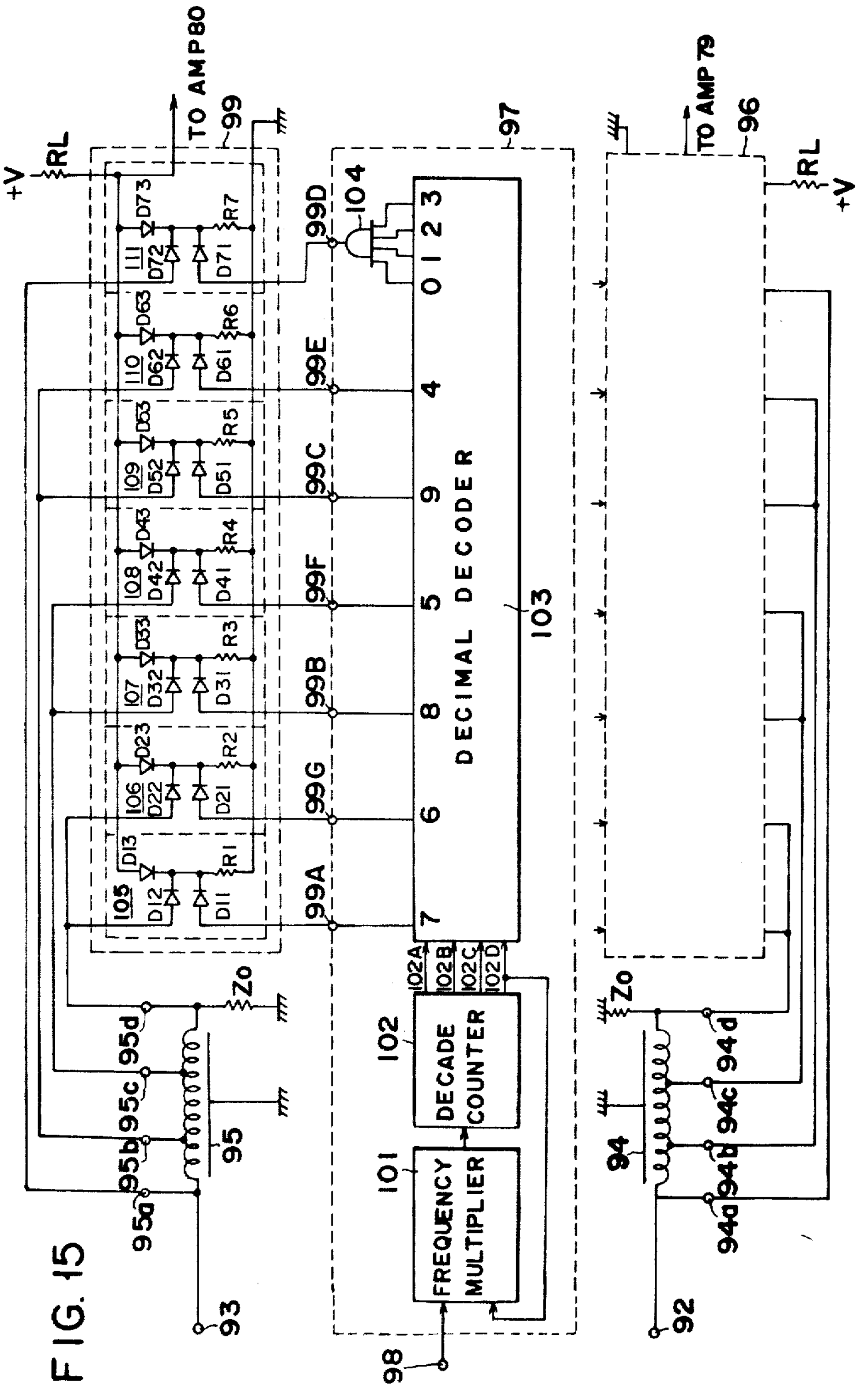
FIG. 15 is a block diagram showing the detail of the circuit shown in FIG. 13.

FIG. 15 shows the detail of the construction of the analogue multiplexers 96, 99 and gate pulse generator 97 shown in FIG. 13. The gate pulse generator 97 comprises a frequency multiplier 101 which is connected to receive the horizontal synchronizing signal at its terminal 98, a decade counter 102 connected to receive the output from the frequency multiplier 101, a decimal decoder 103 connected to receive the output from the decade counter 102, and an AND gate circuit coupled to the outputs of the decimal decoder 103. The frequency multiplier 101 includes a phase locked loop consisting of a phase comparator, a lowpass filter, a voltage controlled oscillator, etc., for example, and functions to compare the phase of the horizontal synchronizing pulse received at the input terminal 98 and shown in FIG. 14B with the phase of the output pulse from the terminal 102D of the decade counter 102 thereby producing a pulse having a frequency 10 times of that of the horizontal synchronizing pulse. The pulse produced by the frequency multiplier 101 is applied to the decade counter 102, in which a decimal counting is effected to produce binary coded decimal signal pulses at the output terminals 102A, 102B, 102C and 102D of the decade counter. These binary coded decimal pulses are supplied to decimal decoder 103 to be decoded into decimal numbers so as to produce output pulses having a high level +5 V and a low level O V respectively, as shown in FIGS. 14C to 14I are produced at the output terminals 99A to 99G of the gate pulse generator 97.

Each of the analogue multiplexers 96 and 99 comprises seven switch units each consisting of three diodes and one resistor, as shown. With reference to one analogue multiplexer 99, the first switch unit 105 thereof comprises a pair of diodes D11 and D12 which are connected in series opposition across the tap 95*d* of the delay line 95 and terminal 99A of the decimal decoder 103, a diode D13 connected between the juncture of the cathode electrodes of diodes D11 and D12, and the output terminal of the analogue multiplexer 99 and a resistor R1 connected between said juncture and the ground. A load resistor RL is connected between the output terminal of the analogue multiplexer 99 and a positive source of supply. The second to seventh switch units 106, 107, 108, 109, 110 and 111 are also constructed similarly to the first switch unit 105. Tap 95*a* of delay line 95 is connected to the anode electrode of the diode D72 of the seventh switch unit 111; tap 95*b* is connected to the anode electrodes of the diodes D52 and D62 of the fifth and sixth switch units 109 and 110; tap 95*c* is connected to the anode electrodes of diodes D32 and D42 of the third and fourth switch units 107 and 108 and the tap 95*d* is connected to the anode electrodes of the diodes D12 and D13 of the first and second switch units 105 and 106. The anode electrodes of diodes D21, D31, D41 . . . D71 are connected to output terminals 99B to 99G respectively of the decimal decoder 103. One terminals of resistors R2 to R7 are commonly connected to the ground and the anode electrodes of diodes D23, D43 . . . D73 are commonly connected to the output terminal of the analogue multiplexer 99. The other analogue multiplexer 96 has an identical construction. It is necessary to select the levels of the video signals supplied to the analogue multiplexers 96 and 99 from taps 94*a* to 94*d* and taps 95*a* to 95*d* such that their low level is higher than V·R*i*/(-R*i*+RL) RL) volts and that their high level is lower than the high level of the gate pulse, for example 5 volts, where Ri represents the resistance of resistors R1–R7, RL the resistance of the load resistance RL and V the voltage of the source.

The switching operation of the analogue multiplexer 99 is as follows: Where no gate pulse is applied to terminal 99A from the gate pulse generator 97, since the anode electrode of diode D11 is at the high level (+5 V) and the diode D12 is reversely biased with the video signal from tap 95d will not appear across resistor R1. In contrary, when a gate pulse at the low level is impressed upon the anode electrode of diode D11, the diode D12 will be biased forwardly and the diode D11 will be biased reversely, so that a video signal will be produced across resistor R1. As above described, since the level of these video signals is selected such that even when they have the highest level the level is lower than the high level (for example 5 V) of the gate pulse, at a given instant, a video signal appears across resistor R1 alone of total of seven resistors R1 to R7 of the analogue multiplexer 99 and a voltage of 5 V which is higher than the maximum value of the video signal voltage will appear across remaining resistors R2 to R7, as a result, current from +V source flows through a resistance alone, for example R1, at the lowest potential across which the video signal appears, thus rendering conductive the diode D13 included in this current path. Accordingly, the anode electrode of diode D13 will assume the video signal potential and only this diode D13 becomes conductive. In this manner, when the gate pulse is sequentially supplied to diodes D11 to D71, the desired video signals would be formed. For the purpose of forming a video signal by combining partial video signals from respective switch units 105 to 111, the anode electrodes of seven diodes D13, D23 . . . D73 are commonly connected to one terminal of the load resistor to constitute a wired AND gate circuit. In this example, the signal of a resistor at the lowest potential among seven resistors is sequentially derived out to form a desired green video signal across the load resistor RL. The other analogue multiplexer 96 also operates in the same manner to form a red video signal.

Although in this example, diode switch units were used to constitute the analogue multiplexers, it should be understood that such multiplexers can also be fabricated with field effect transistor switching units.

In the above embodiment, although a well known static convergence device was used to align three electron beams at the central portion of the picture and to make symmetrical the misalignments at the peripheral regions with respect to the central region, even when the static convergence device is not used so that misalignment occurs over the entire surface of the picture or when the misalignments in the peripheral regions are not symmetrical with respect to the central region, it is possible to provide similar convergence compensation by changing the position and number of the taps of the delay lines or by varying the manner of dividing the picture.

In the above embodiment, the convergence compensation was described in connection with a case wherein the vertical lines are separated for respective colours at each end of the picture as shown in FIG. 2, it should be understood that various other types of convergence may also be used. Thus, for example, in the case shown in FIG. 16, three vertical lines 130R, 130G and 130B of the picture coincide each other at the center but are separated at the upper and lower edges at the central region. However, at the opposite regions three vertical lines 131R, 131G and 131B separate not only at the center but also at the upper and lower edges. In this case, the extent of time delay of lines 130R, 130B, 131R and 131B varies not only in the horizontal direction but also in the vertical direction of the picture. For the sake of following description, it is assumed that the picture is divided into three horizontal regions H, I and J and that a horizontal straight line Y—Y is drawn at the center of region I to divide it into two regions.

Figure 16:
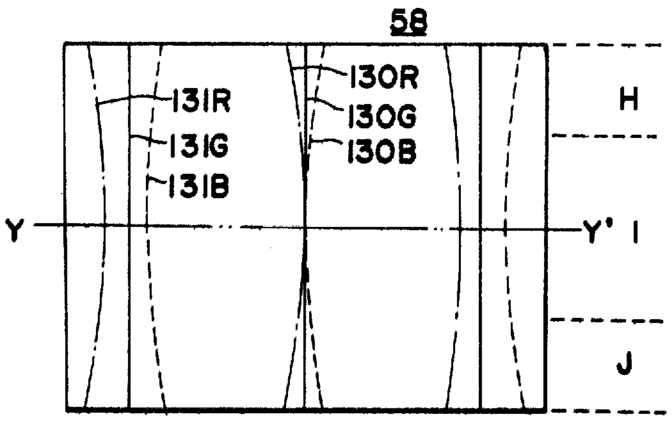
FIG. 16 is a diagram showing another example of the distortion of the picture image.
Figure 17:
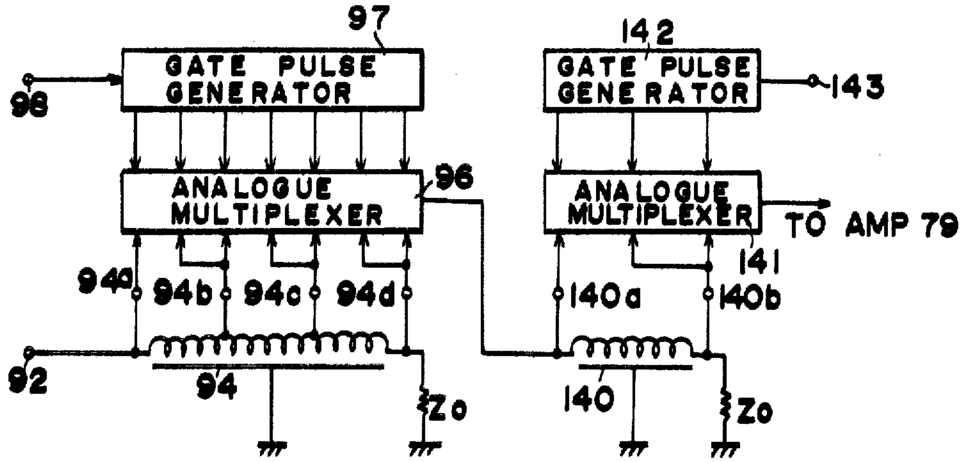
FIG. 17 shows a block diagram of a circuit for compensating for the distortion of the picture shown in FIG. 16.

FIG. 17 shows the block diagram of a modification for effecting effective compensation for such a case. However, to simplify the drawing, only the compensation circuit for the red signal is shown. Since the mode of misconvergence at the portion along line Y—Y, FIG. 16, is similar to that shown in FIG. 2, such misconvergence can be made by using delay line 94, analogue multiplexer 96 and gate pulse generator 97 as in the case of FIG. 13. Further, it is necessary to make compensation for the upper and lower edge portions of the picture 58. Ideally, such compensation should be made by continuously increasing the delay time from the line Y—Y both in the upper and lower directions, practically however, the desired compensation can be made by varying stepwisely the time delay as shown in FIG. 12.

The remaining portion of the circuit shown in FIG. 17 is constituted by a delay line 140 which is connected to receive the output from the analogue multiplexer 96 at its one end and is terminated with a characteristic impedance ZO at the opposite end, an analogue multiplexer 141 connected to receive the outputs from two taps 140*a* and 140*b* of the delay line 140, and a gate pulse generator 142 for supplying a gate pulse to the analogue multiplexer 141. The gate pulse generator 142 is driven by a vertical synchronizing signal impressed upon terminal 143. The circuit of this construction is suitable for providing stepwise compensation for regions H, I and J where the mode of misconvergence is symmetrical with respect to horizontal center line Y—Y. Thus, the gate pulse generator 142 is driven by a signal corresponding to a vertical synchronizing pulse impressed upon input terminal 143 for supplying three gate pulses to the analogue multiplexer 141 with timings corresponding to respective regions H, I and J. By the action of the gate pulses applied to analogue multiplexer, a video signal is produced thereby for region I corresponding to the signal supplied from the output tap 140*a* of delay line 140 and video signals are produced for regions H and J corresponding to the signal supplied from output tap 140*b*. With this construction, it is possible to provide a satisfactory compensation for misconvergences in the left and right and upper and lower directions of the picture as shown in FIG. 16. For the sake of description, in this embodiment, three horizontal regions formed by dividing the picture along three vertically spaced lines were compensated for independently, it is possible to increase the degree of compensation by increasing the number of such divided regions. FIG. 17 shows only the circuit for compensating the red signal but it should be understood that similar circuits are of course provided for green and blue signals.

Instead of providing distortion compensation for video signals applied to electron guns for red and green among three electron guns for red, green and blue, it is also possible to provide such distortion compensation for the blue signal.

Figure 18:
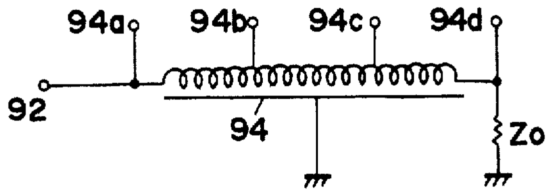
FIGS. 18 to 22 show other examples of the delay means.
Figure 19:
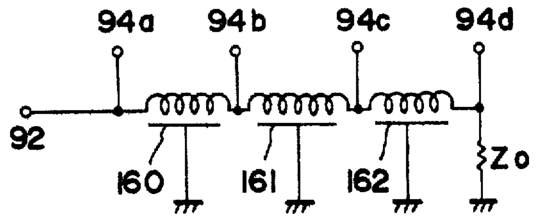
Figure 20:
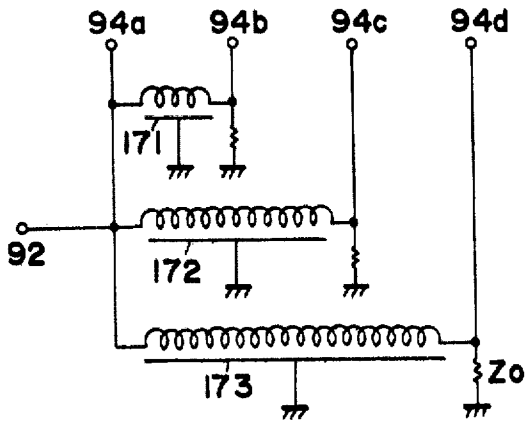

FIG. 18 shows the delay line 94 shown in FIG. 17. Denoting the time delays between terminals 94*a* and 94*b*, terminals 94*b* and 94*c* and terminal 94*c* and 94*d* by $t1$, $t2$ and $t3$, respectively, it will be clear that such continuous delay line 94 may be substituted by three discrete and serially connected delay line sections 160, 161 and 162 having delay times $t1$, $t2$ and $t3$, respectively and with taps 94*b* and 94*c* connected to respective junctures, as shown in FIG. 19. Other time delay means capable of producing at the terminals 94*b*, 94*c* and 94*d* three outputs having delay times $t1$, $t1+t2$ and $t1+t2+t3$, such as shown in FIG. 20 can also be used wherein three delay line sections 171, 172 and 173 having delay times $t1$, $t1+t2$ and $t1+t\ 2+t3$ are connected in parallel to terminal 92.

Figure 21:
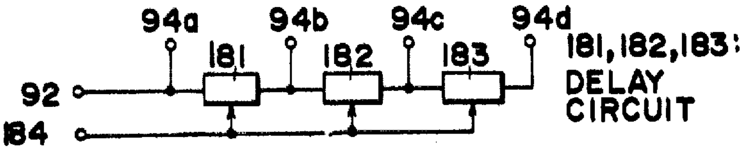
Figure 22:
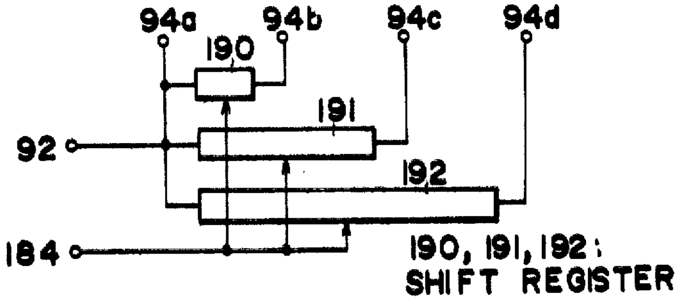

Further, the delay line can be replaced by such analogue shift register as a charge coupled device or a bucket brigade device as above described. FIG. 21 illustrates one example of a delay circuit constituted by such analogue shift registers wherein three analogue shift registers 181, 182 and 183 are connected in series with terminal 92. Respective analogue shift registers are connected to receive from a clock input terminal a clock pulse having a charge transfer frequency $f$. Accordingly, in order to provide a time delay of $t1$ by shift register 181, it is necessary to set the bit number N thereof to be $ft1 \leq N1$ (N being an integer). In the same manner, the bit numbers of shift registers 182 and 183 are set to be $ft2 \leq N_2$ and $ft3 \leq N_3$ respectively. Thus, where analogue shift registers are used, as shown in FIG. 22, analogue shift resisters 190, 191 and 192 having bit numbers $ft1$, $f(t1+t2) \leq N_4$ and $f(t1+t2+t3) \leq N_5$, respectively may be connected in parallel to input terminal 92, in the same manner as the arrangement shown in FIG. 20. In this case, the charge transfer frequency is determined dependent upon the maximum frequency of the video signal.

Since the analogue multiplexers 96 and 99 including diodes utilized in the circuit shown in FIG. 15 have relatively low input impedance, undesirable impedance mismatch is formed between the analogue multiplexer and the delay lines 94 and 95 with the result that discontinuous portions might be displayed at the border lines between respective regions A to G shown in FIG. 11, for example.

Figure 23:
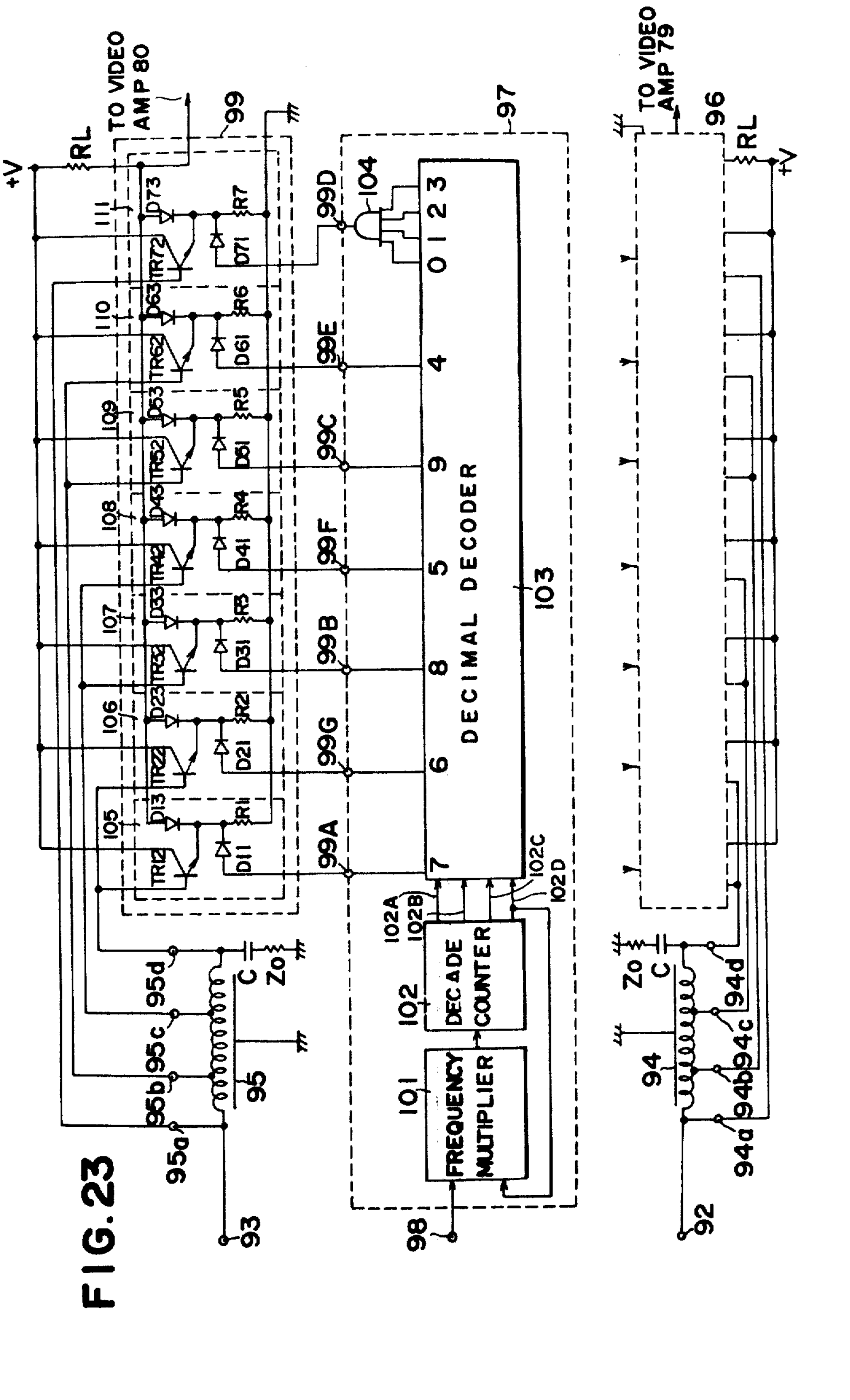
FIG. 23 is a block diagram showing still another modification of this invention.

FIG. 23 shows still further embodiment of this invention capable of obviating this difficulty. In this embodiment, the didodes D12 to D72 utilized in respective switch units 105 to 111 of the analogue multiplexers 96 and 99 shown in FIG. 15 are replaced by transistors TR12 to TR72. In analogue multiplexer 99, the base electrodes of transistors TR12 to TR72 are connected to taps 95*a* to 95*d* of the delay line 95, and the collector electrodes are directly connected to a common conductor from +V source. The emitter electrodes are connected to junctures between the cathode electrodes of respective diodes D13 to D73 and respective resistors R1 to R7. The remaining portions of this embodiment are connected in the same manner as in FIG. 15 except that one terminals of delay lines 94 and 95 are connected to characteristic impedances Z0 through capacitors C respectively.

This arrangement increases the input impedance of the analogue multiplexers 96 and 99 as seen from taps 94*a* to 94*d* and taps 95*a* to 95*d* of respective delay lines 94 and 95 so that it is possible to prevent the impedance mismatch between the analogue multiplexers and the delay lines, whereby it is possible to prevent to display discontinuous stripes at the border lines between respective regions A to G, shown in FIG. 11, for example.

Figure 24:
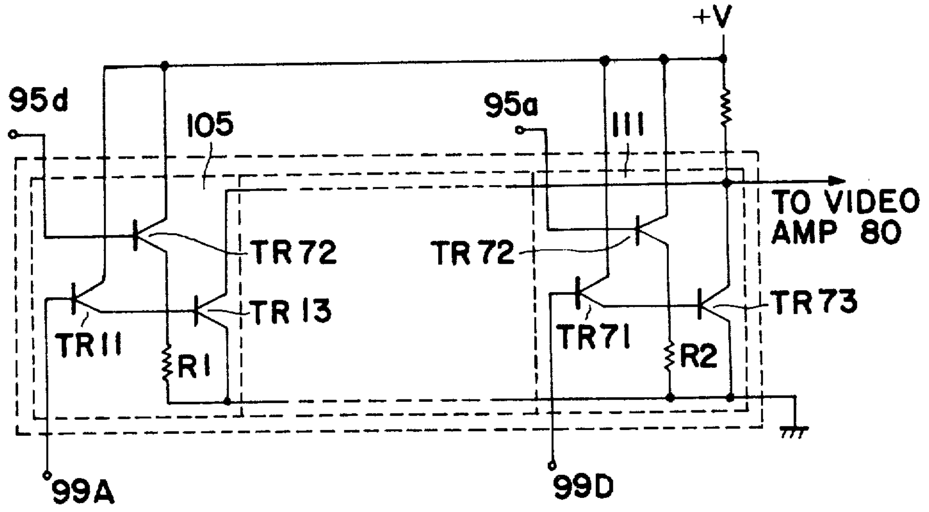
FIG. 24 shows a connection diagram of a modification of the analogue multiplexer utilized in the circuit shown in FIG. 23.

It is also possible to substitute transistors for diodes D11-D71 and diodes D13-D73 of respective switch units 105 to 111. FIG. 24 shows one example of such substitution wherein transistors TR11 to TR71 are substituted for diodes D11 to D71 shown in FIG. 23 and transistors TR13 to TR73 are substituted for diodes D13 to D73. In this embodiment, the base electrodes of transistors TR11 to TR71 are connected to output terminals 99A and 99D of gate pulse generator 97, the collector electrodes are commonly connected to +V source and the emitter electrodes are connected to emitter electrodes of transistors TR12 to TR72. The base electrodes of respective transistors TR13 to TR73 are connected to the emitter electrodes of respective transistors, the emitter electrodes of respective transistors TR13 to TR73 are commonly connected to the output terminal of the analogue multiplexer 99 and the collector electrodes are commonly connected to the ground.

By substituting transistors TR11 to TR71 for diodes D11 to D71 (shown in FIG. 23) in this manner, it is possible to increase the input impedance to the analogue multiplexer 99 as seen from the output terminals 99A and 99D of the gate pulse generator 97 so that it is possible to decrease the load on the gate pulse generator. Also substitution of transistors TR13 to TR73 for diodes D13 to D73 decreases the output impedance of the analogue multiplexer 99.

Figure 25:
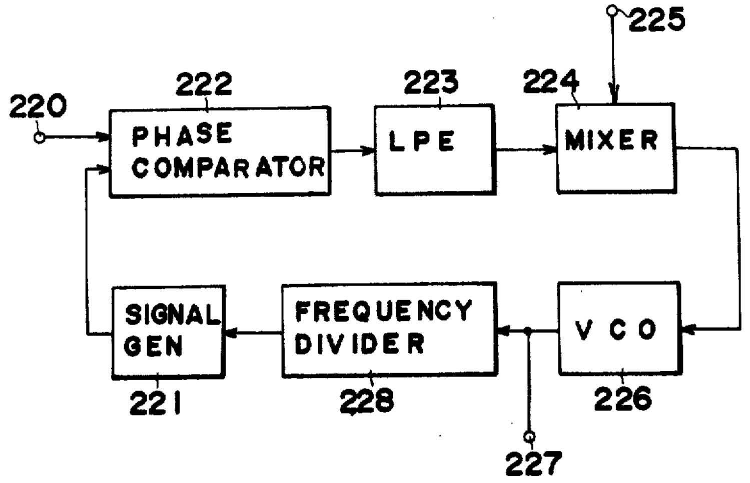
FIG. 25 is a block diagram showing one example of the gate pulse generator shown in FIG. 23.
Figures 26A, 26B, 26C, 26D, 26E, 26F, 26G, 26H, 26I:
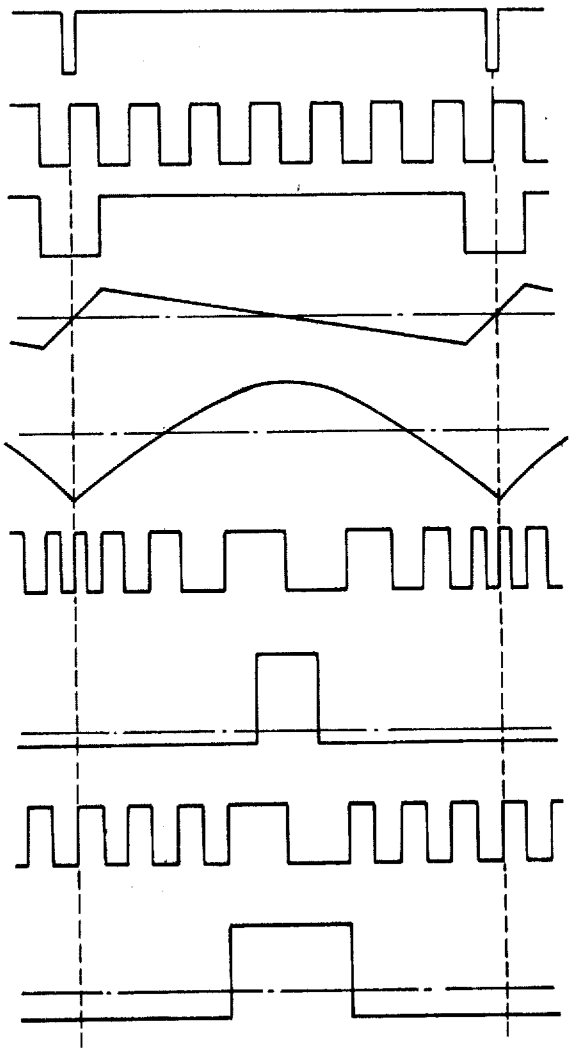
FIGS. 26A to 26I are waveforms for explaining the operation of the circuit shown in FIG. 25.

The select pulse generator utilized in the picture distortion compensating apparatus of this invention will now be described. FIG. 25 illustrates one example of such select pulse generator wherein a horizontal synchronizing pulse as shown in FIG. 26A is applied to the input terminal 220. The horizontal synchronizing pulse is applied to a phase comparator 222 together with the output from a reference signal shaper 221 and an output corresponding to the phase difference between the two inputs is sent to a mixer 224 via a lowpass filter 223. The mixer 224 is also supplied with a modulated signal having a waveform as shown in FIG. 26E and is applied to input terminal 225, and the modulated output from the mixer is applied to the control input terminal of a voltage controlled type oscillator 226. The output of this oscillator is derived out as the output of the select pulse generator through output terminal 227. The output of the oscillator is also applied to a frequency divider 228, the output thereof being applied to the reference signal shaper 221.

The autogeneous frequency of the voltage controlled type oscillator 226 is selected to be n times (for example 7 times) of that of the horizontal synchronizing pulse impressed upon terminal 220, and the output of the oscillator 226 has a waveform as shown by FIG. 26B, for example. This output is applied to frequency divider 228 to reduce its frequency to 1/7, thereby providing a signal as shown in FIG. 26C to the reference signal shaper 221 which functions to convert the signal shown in FIG. 26C into a sawtooth signal having a waveform as shown in FIG. 26D. The sawtooth signal is sent to the phase comparator 222. The phase angles of the signal shown in FIG. 26A and impressed upon input terminal 220 and of the signal shown in FIG. 26D are compared by phase comparator 222 to produce a difference signal or an error signal corresponding to the phase difference between the two inputs to the phase comparator. Unwanted frequency components of the error signal are eliminated by the lowpass filter 223 and the resulting signal is sent to the mixer 25. The modulated signal shown in FIG. 26E and applied to the mixer 25 via input terminal 225 is mixed with the output from the lowpass filter 223 to produce an output which is utilized to control the oscillation frequency of the voltage controlled type oscillator 226 thus producing at output terminal 227 an output corresponding to the modulated signal as shown in FIG. 26F.

Instead of using the modulated signal as shown in FIG. 26E, if a modulated signal shown in FIG. 26G were used, an output shown in FIG. 26H and has been frequency modulated would be produced. When subjected to frequency modulation the signal shown in FIG. 26G has been used as the modulation signal will be changed to a signal substantially as shown in FIG. 26I. The dot and dash lines shown in FIGS. 26E, 26G and 26I represent the level of the frequency control signal indicating that the modulating signal has been mixed in an AC wise. The circuit shown in FIG. 25 comprises a phase locked loop wherein signals shown in FIGS. 26A to 26I are coupled together at a phase relationship indicated by vertical dotted lines.

More practical example of the select pulse generator will be described hereunder with reference to FIG. 27 and FIGS. 28A to 28U. The circuit shown in FIG. 27 functions to provide frequency modulation by the modulation signal as well as frequency multiplication and by using a ring counter as the frequency divider shown in FIG. 25 it is possible to simultaneously generate gate pulses as shown in FIGS. 14A to 14I. In the circuit shown in FIG. 27, component elements corresponding to those shown in FIG. 25 are designated by the same reference numerals. More particularly, the phase comparator 222 is shown as a single ended phase comparator which comprises a capacitor 222*a* with one electrode connected to terminal 220, a pair of diodes 222*b* and 222*c* with their cathode electrodes connected to the other electrode of the capacitor 222*a*, and a pair of resistors 222*d* and 222*e* respectively connected in parallel with diodes 222*b* and 222*c*. The output from the phase comparator 222 is applied to one terminal of the resistor 223*a* of the lowpass filter 223 from the anode electrode of diode 222*b*. The other end of resistor 223*a* is connected to one end of resistor 224*a* constituting the lowpass filter 224 and to one end of the resistor 224*a* of the mixer 224. The other end of resistor 224*a* is connected to terminal 225 via capacitor 224*b* and to the base electrode of transistor 226*a* of the voltage controlled type oscillator 226. The emitter electrode of transistor 226*a* is connected to the positive terminal of source E1 and to one terminal of a variable resistor 240 with its opposite terminal grounded. The collector electrode of transistor 226*a* is grounded through a resistor 226*c* and a capacitor 226*d*. The common juncture between resistor 226*c* and capacitor 226*d* is connected to the emitter electrode of a unijunction transistor 226*e* having its first base electrode grounded and the second base electrode connected to source E1 via resistor 226*f* and to the output terminal 227. The second base electrode of the unijunction transistor 226*e* is connected to the input terminal 228*a* of the frequency divider 228 via a capacitor 241 and is grounded through a resistor 242. The second base electrode is also connected to one electrode of source E2 via a resistor 243.

The frequency divider 228 comprises a counter circuit 228*b* made up of seven flip-flop circuits FF, an inverter 228*c* and a NAND gate circuit 228*d*; and an inverter 228*e* for applying the clock signal from terminal 228 upon the flip-flop circuits. The output from the 7 bit ring counter 228*b* is taken out through seven output terminals 228A to 228G for application to terminals 99A to 99G shown in FIG. 23, for example. A signal appearing at terminal 228A and whose frequency has been reduced to 1/7 is applied to the juncture between capacitors 221*b* and 244 of the reference signal shaper 221 via an inductor 221*a*. The opposite end of capacitor 224 is connected to the sliding arm of resistor 240 via a resistor 245 and to the anode electrode of diode 222*c* of the phase comparator 222.

The operation of the circuit shown in FIG. 27 will now be described with reference to FIGS. 28A to 28U. A horizontal synchronizing pulse as shown in FIG. 28A is impressed upon the reference signal input terminal 220 and then variable resistor 240 is adjusted to set the autogeneous frequency of the voltage controlled type oscillator 226 to be about seven times of the frequency of the horizontal synchronizing pulse. Then, as has been discussed in connection with FIG. 25, the oscillation frequency of the voltage controlled type oscillator 226 is locked to a frequency just seven times of the frequency of the input horizontal synchronizing pulse. Under these conditions, an output as shown in FIG. 28B will appear at the output terminal 227 of the voltage controlled type oscillator 226. The ring counter 228*b* driven by this output produces output pulses shown in FIGS. 28C to 28I, respectively on the output terminals 228*a* to 228*g* thereof. The sawtooth voltage to be shaped by the action of reference signal shaper 221 is locked with the synchronizing pulse shown in FIG. 28A with a phase shown in FIG. 28J. A pulse signal shown in FIG. 28K and obtained by inverting the polarity of the signal appearing at output terminal 228*a* of ring counter 228*b* and shown in FIG. 28F is impressed upon modulation signal input terminal 225. Then, a signal frequency modulated with a modulation signal shown in FIG. 28K and shown by FIG. 28L will appear at the output terminal 227 of the voltage controlled type oscillator 226. The seven bit ring counter 228*b* driven by this output signal produces at its output terminals 228A to 228G gate pulse signals having waveforms as shown in FIGS. 28M to 28S.

Figure 27:
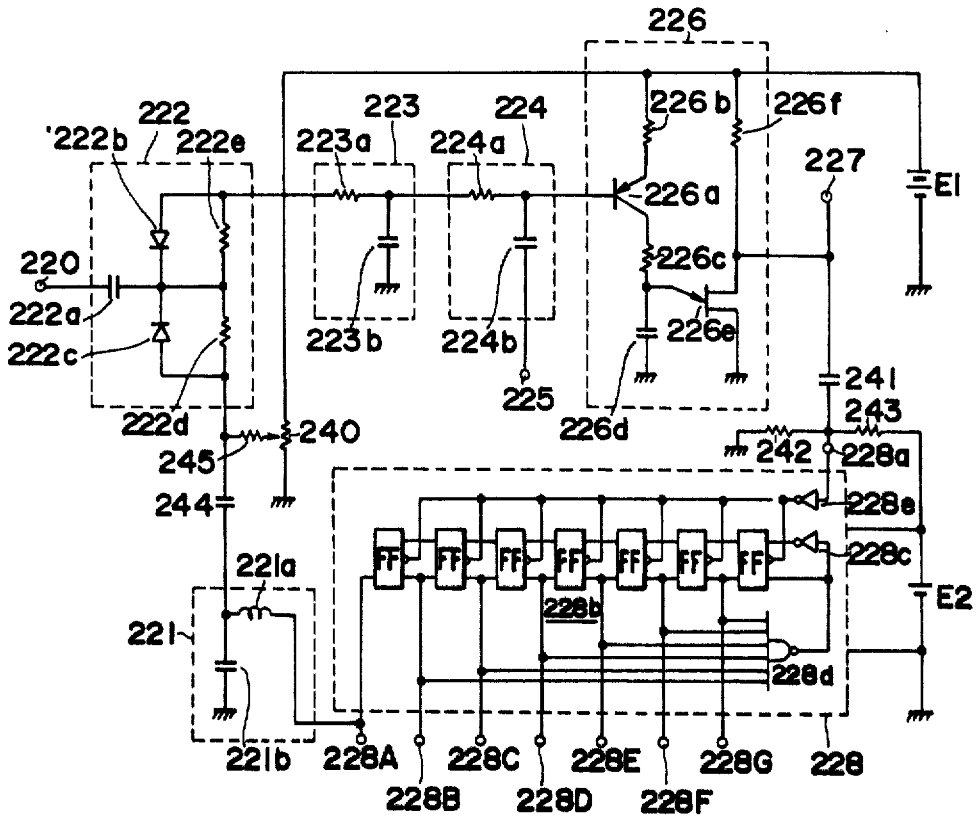
FIG. 27 is a connection diagram showing the detail of the construction of the circuit shown in FIG. 25.
Figure 28:
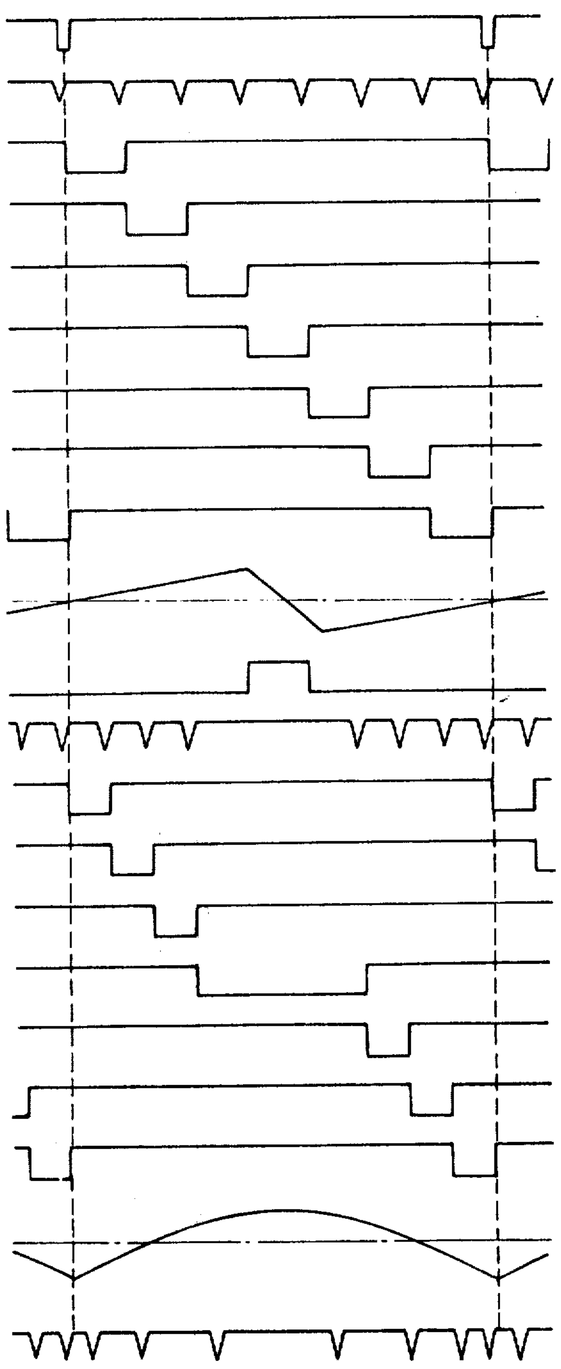
FIGS. 28A to 28U show waveforms useful to explain the operation of the circuit shown in FIG. 27.

Furthermore, in the circuit shown in FIG. 27, if a parabolic modulated signal shown in FIG. 28T and has been formed by shaping the input horizontal synchronizing pulse or the pulse signals shown in FIGS. 28C and 28I and appearing at the output terminals 228A to 228G of the ring counter 228*b*, is used, a frequency modulated output as shown in FIG. 28U will be produced by the voltage controlled type oscillator 226.

In this case, since gate pulses for gradually decreasing the dividing width of the screen from the center to the peripheral portion thereof are obtained at the output terminals 228A to 228G of ring counter 228*b*, it is possible to obtain a most desirable division in which the differences between the amount of the delays are equal in any divided area.

Figure 29:
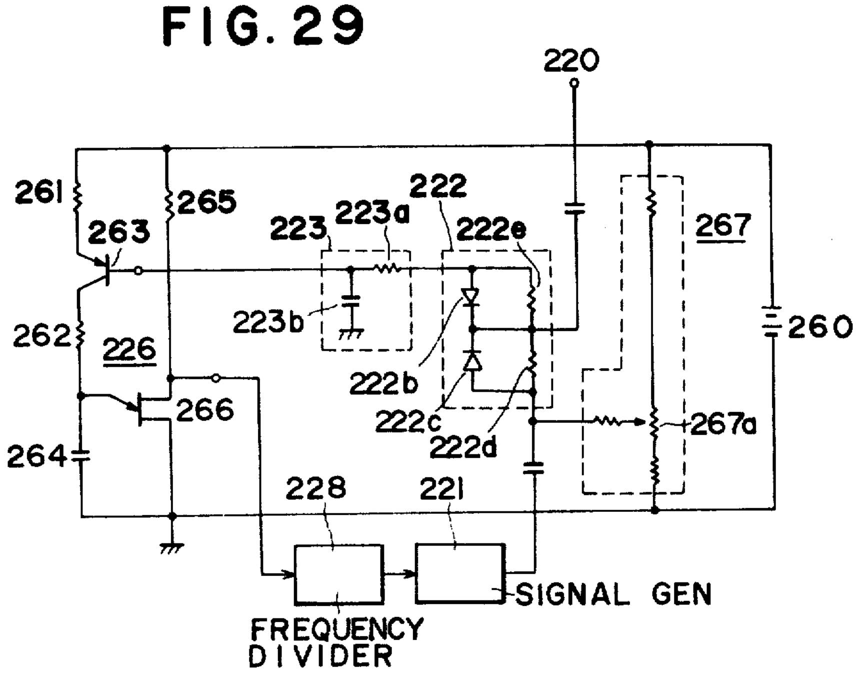
FIG. 29 is a connection diagram showing one example of the frequency multiplier utilized in the circuit shown in FIG. 23.

The detail of the circuit of the frequency multiplier utilized in the gate pulse generator of this invention will be described hereunder with reference to FIGS. 29 and 30. The frequency multiplier shown in FIG. 29 is suitable for use as the multiplier 101 comprising the gate pulse generator 97 shown in FIG. 23, for example. The circuit elements shown in FIG. 29 which correspond to those shown in FIGS. 25 and 27 are designated by the same reference numerals. The frequency multiplier shown in FIG. 29 comprises a unijunction transistor 266 which is connected across a DC source 260 via resistors 261 and 262, a transistor 263, a capacitor 264 and a resistor 265 which are connected in series. The emitter electrode of the unijunction transistor 266 is connected to the juncture between resistor 262 and capacitor 264. The unijunction transistor 266 and transistor 263 cooperate to act as a voltage controlled type oscillator 226. The frequency of the output pulse from the oscillator 226 is preset to be n times (for example 7 times) of that of the horizontal synchronizing pulse supplied to terminal 220 by adjusting the resistor 262 and a breeder circuit 267. Consequently, 1/*n* frequency divider 228 produces an output having a frequency substantially equal to that of the horizontal synchronizing pulse. This output pulse is applied to the phase comparator 222 via reference signal shaper 221. The purpose of the breeder circuit 267 is to adjust variable resistor 267*a* for adjusting the DC voltage applied to the base electrode of transistor 263, thereby adjusting the frequency of the oscillator 226. Since the basic operation of this circuit is similar to that shown in FIG. 27, it is believed unnecessary to describe it further.

Figure 30:
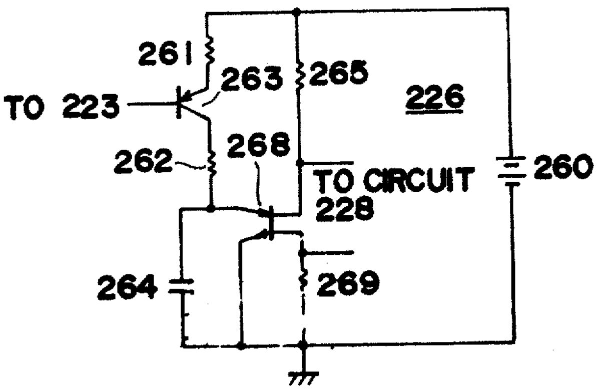
FIG. 30 shows another example of the voltage regulated type oscillator utilized in the circuit shown in FIG. 29.

FIG. 30 shows a modification of the circuit shown in FIG. 29 wherein the unijunction transistor 266 is substituted by a silicon controlled switch acting as a switching element having negative characteristics. FIG. 30 shows only the portion of the voltage controlled type oscillator 226, and the circuit element corresponding to those shown in FIG. 29 are designated by the same reference numerals. More particularly, the collector electrode of transistor 263 is connected to the anode electrode of the silicon controlled switch 268 and the cathode electrode thereof is grounded. A capacitor 264 is connected between the anode and cathode electrodes of the silicon controlled switch 268. The first gate electrode of the silicon controlled switch 268 is connected to one terminal of resistor 265, whereas the second gate electrode is grounded through a resistor 269. This construction also produces similar oscillation outputs.

Figure 31:
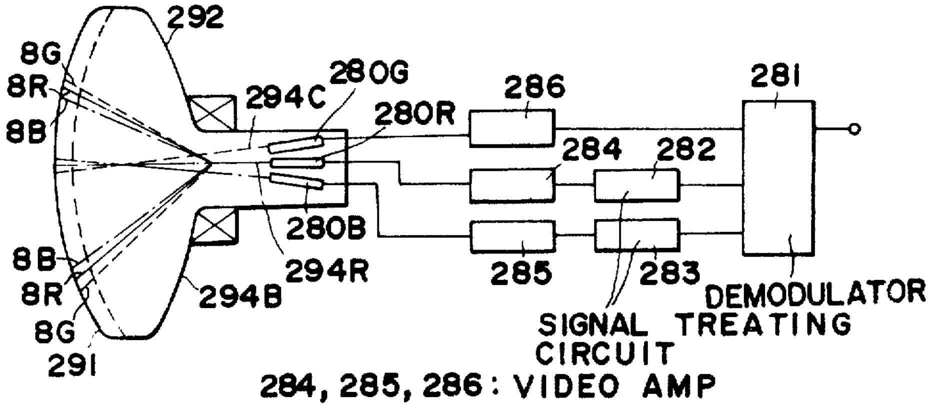
FIG. 31 is a diagram showing another type of colour picture tube incorporated with the distortion compensating device of this invention.
Figure 32:
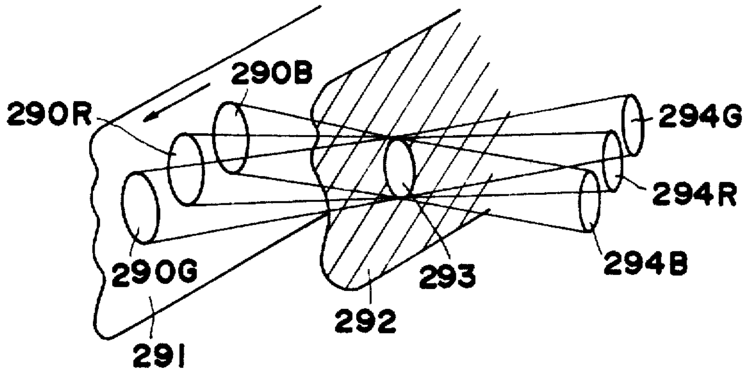
FIG. 32 is a diagram showing the arrangement of phosphor dots utilized in the colour picture tube shown in FIG. 31.

When the picture distortion compensating device of this invention described above is combined with an inline type cathode ray tube as shown in FIG. 31, an excellent distortion compensating action can be obtained. As shown in FIG. 32, the colour picture tube is provided with a fluorescent screen 291 is which phosphor dots 290B, 290R and 290G are disposed in the order to blue, red and green in the direction of horizontal scanning as shown by an arrow. The electron gun assembly for projecting three electron beams 294B, 294R and 294G upon the fluorescent screen 291 through a perforation 293 of a cooperating shadow mask 292 comprises a blue electron gun 280B, a red electron gun 280R and a green electron gun 280G which are arranged in-line along the direction of horizontal scanning. Where the inclination angles of the electron guns 280B and 280G on the opposite sides of the central electron gun 280R are made large so that the point of crossing of three electron beams 294B, 294R and 294G is situated between the shadow mask 292 and the electron gun assembly, that is in the case of an over convergence, the phosphor dots on the fluorescent screen 291 are arranged in an order opposite to that of the horizontal arrangement of electron guns 280B, 280R and 280G, that is in the order of 290B, 290R and 290G. Where the inclination angles of the outer electron guns 280B and 280G with respect to the axis of the central electron gun 280R are small so the point of intersection of three electron beams 294B, 294R and 294G is located on the outside of the shadow mask 292 and the fluorescent screen 291, the electron guns 280B, 280R and 280G and the phophor dots 290B, 290R and 290G are disposed in the horizontal direction at the same order.

In FIG. 31 where the direction of the horizontal scanning is in the direction of arrow and where the under convergence is contemplated, the luminescent point 290G of the electron beam 294G will always occur at the beginning of the scanning. By lagging the video signals applied to electron guns 280R and 280B for intervals determined by the spacings between phosphor dots 290G and 290R and between phosphor dots 290G and 290B and by the horizontal scanning speed it is possible to reproduce a picture of high quality over the entire surface of the fluorescent screen which is equivalent to that produced where three electron beams 294B, 294R and 294G are caused to concentrate on the surface of the shadow mask 292. Thus, the red and blue signals of the output signal from the primary colour signal demodulation circuit 281 are delayed by variable delay circuits 282 and 283 by suitable intervals and amplified by video signal amplifiers 284 and 285, whereas the green signal is applied directly to video signal amplifier 286.

With the circuit constructed as above described, even at points where the delays are large, it is possible to reproduce pictures of high quality without any distortion. The same advantageous effect can also be provided with over convergence.

It will be clear that in order to more efficiently and effectively synthesize picture images of three primary colours, the extent of compression, elongation and delay of the signals should be small, in other words, the difference in time between a reference raster and two other rasters which are superposed each other should be small.

Figure 33:
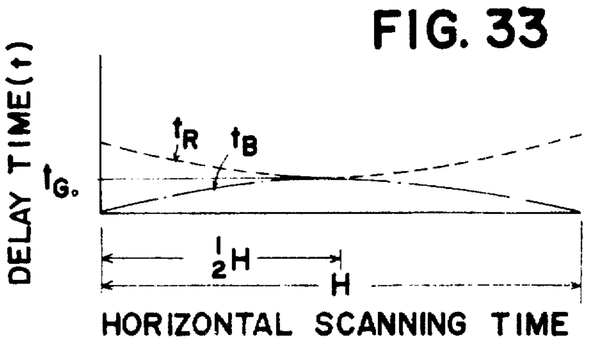
FIG. 33 is a plot for explaining the principle of a modified convergence apparatus embodying the invention.
Figure 34:
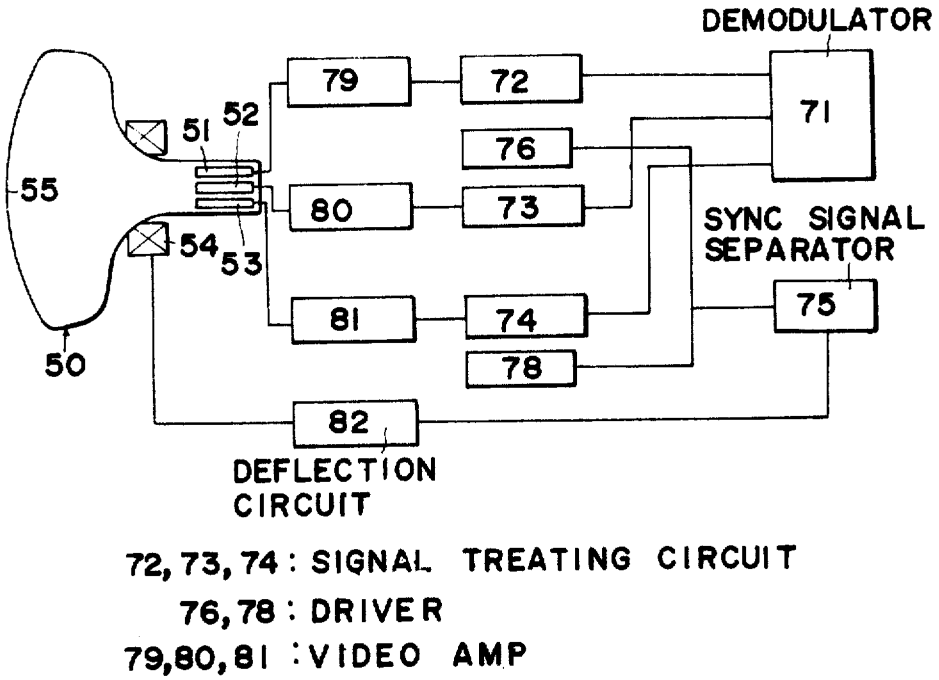
FIG. 34 is a block diagram showing a modified convergence apparatus utilizing the principle shown in FIG. 33.

FIGS. 33 and 34 show another embodiment of this invention based on this principle. This modification is characterized in that the green drive circuit 77 shown in FIG. 4 has been eliminated from the circuit shown in FIG. 34 so that only the green signal is not subjected to the time axis conversion processing. The remaining circuit components are identical to those shown in FIG. 4.

more particularly, as shown in FIG. 33, the video signal comprising the green raster is subjected to a fixed delay tGO. Where it is intended to coincide the red and blue rasters with the resulting green raster, it is necessary to apply time axis conversion quantities tR and tB as shown in FIG. 33 upon the red and blue video signals. Thus, tR comprises a fixed component tGO and a variable component which is equal to *t*B, and the required rate of compression and elongation is only about one-half of that required for coinciding the red raster with the blue raster.

In this embodiment, the fixed delay is applied to the video signal adapted to modulate the electron beam emanated from the center electron gun of three guns 51, 52 and 53 which are arranged in-line, whereas video signals adapted to modulate remaining two electron beams are subjected to one of the time axis conversion processings of compression, elongation and delay in such a manner that at least two different processings are applied during each horizontal scanning period. For this reason, it is possible to produce a satisfactory composite picture free from any color misalignment.

It is also possible to realize this invention by using memories for memorizing an image signal as a time axis varying circuit.

For example, a first device for varying the time axis of the image signal by means of compression, expansion or delay with respect to time can be used to correct the displacement of the picture image in accordance with the displacement of the picture image. Thus treated image signal is memorized in the memory and then read out to correct the electron beam of a colour cathode ray tube.

Further, a second device operated in a manner in which the image signal is memorized in a memory and read out therefrom by means of compression, expansion or delay with respect to time can also be used to correct the displacement of the respective primary colour pictures in accordance with the displacement of the colour picture. The read out image signal is used to correct the image signal.

It is also possible to provide a third device made up by combining the above-mentioned first and second devices.

The third device is constructed with first and second frequency multipliers generating n times line scanning frequencies, first and second analogue memories with a capacity of n bits, means for alternately storing the image signal into the first and second analogue memories every time the line scanning period comes according to the clock pulses relating to the output of the first frequency multiplier, means for alternately reading out the image signal stored in the first and second analogue memories every time the line scanning period comes according to the clock pulses relating to the output of the second frequency multiplier, and means for frequency modulating the output of the second frequency multiplier by the displacement correction signal obtained in accordance with the displacement of the reproduced picture images, so as to correct the displacement of the primary colour pictures.

Figure 35:
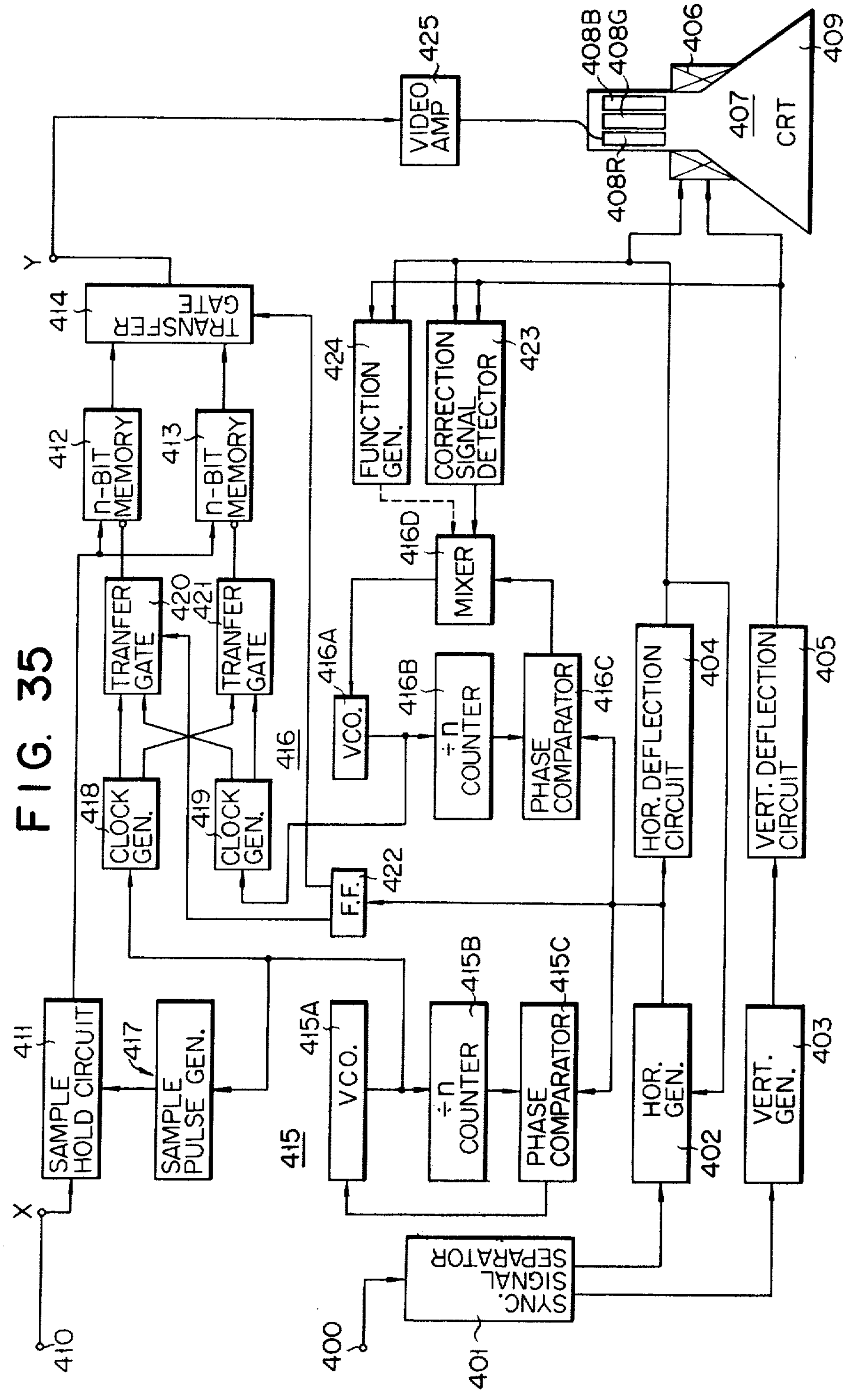
FIG. 35 is a block diagram of a still further embodiment of the invention.

FIG. 35 shows a block diagram of a modified time axis varying circuit used in a television receiver of the invention. In FIG. 35, an image signal supplied to a terminal 400 is added to a synchronizing signal separation circuit 401 wherein a horizontal and vertical synchronizing signals are separated from the image signal. The horizontal synchronizing signal is added to a horizontal generation and automatic frequency control (AFC) circuit 402, while the vertical synchronizing signal is added to a vertical generation circuit 403 to synchronize the horizontal and vertical oscillation frequency with the separated horizontal and vertical synchronizing signals respectively. The output from horizontal oscillation circuit 402 is supplied to drive a horizontal deflection circuit 404, and the output from vertical oscillation circuit 403 is supplied to drive a vertical deflection circuit 405 so as to generate a sawtooth wave current and supply it to a deflection coil 406 connected to the output terminal of the above-mentioned circuits 404 and 405. The electron beams emitted from electron guns 408R, 408G, 408B of a colour cathode ray tube 407 are deflected by the deflection coil 406 to scan the face plate of the tube 407 thereby reproducing a colour picture image on the face plate.

While, a sample hold circuit 411 of the time axis varying circuit is connected in a circuit path in which a red colour signal supplied on a terminal 410 passes. The output image signal from sample hold circuit 411 is alternately stored into first and second analogue memories with n-bit memory capacity in an every horizontal scanning period. As the first and second analogue memories analogue shift registers 412 and 413 such as bucket brigade devices may be used. The image signal stored in shift registers 412, 413 is alternately read out therefrom through a transfer gate 414 in an every horizontal scanning period.

A voltage controlled oscillator 415A for generating a frequency of n times horizontal oscillation frequency, ÷ *n* counter 415B, and a phase comparison circuit 415C constitute a first frequency multiplier 415, and a voltage controlled oscillator 416A, ÷ *n* counter 416B, a phase comparison circuit 416C, and a mixer constitute a second frequency multiplier 416. A sampling pulse generator 417 generating sampling pulses to be supplied to sample hold circuit 411 according to the output of first frequency multiplier 415, and a clock pulse generator 418 generating clock pulses for storing the image signal to first and second analogue memories 412 and 413 are provided. Clock pulses for reading out the image signal from first and second analogue memories 412 and 413 according to the output of second frequency multiplier 418 are generated from a clock pulse generator 419. The clock pulses from clock pulse generators 418 and 419 are alternately supplied to first and second analogue memories 412 and 413 in an every horizontal scanning period through transfer gates 420 and 421 and a flip-flop circuit 422. A distortion correction signal according to a non-linear characteristics of a deflection device and the like is supplied to mixer 416D through a distortion signal detection circuit 423 or a correcting function generator 424. In the case of FIG. 35, though only the circuit for red colour image signal is explained, it can also be used the similar circuit for blue or blue and green colour image signals.

The operation of the above-mentioned circuit is as follows. Where the terminal 400 of FIG. 35 is supplied with a red image signal of FIG. 36A, an output pulse from the horizontal oscillation circuit 402 is, as is well known, synchronized with the frequency of a synchronizing signal of FIG. 36B included in an image signal.

Figures 36A, 36B, 36C, 36D, 36E, 36F, 36G, 36H, 36I, 36J, 36K, 36L, 36M, 36N:
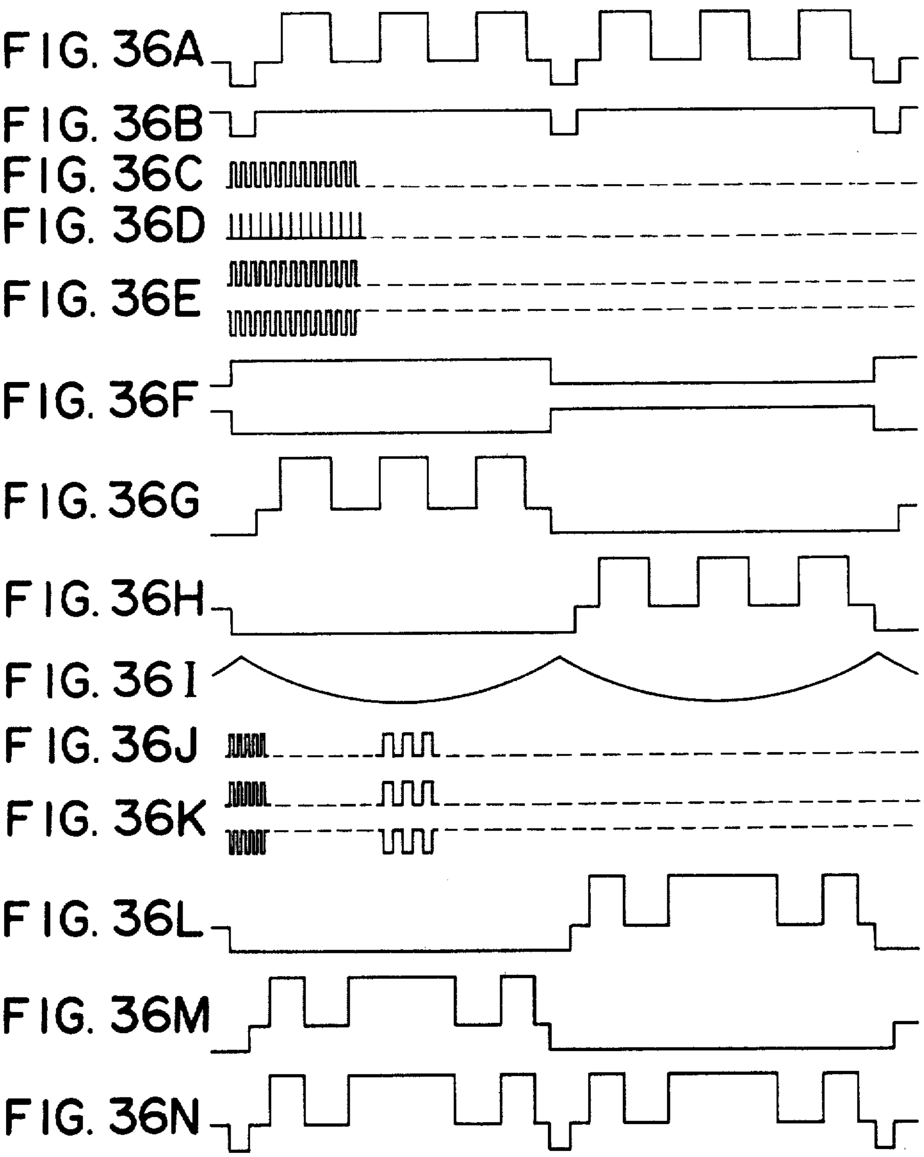
FIGS. 36A to 36N show waveforms for explaining the operation of the device shown in FIG. 35.

The first frequency multiplier 415 generates a pulse signal of FIG. 36C having a frequency n times that of the output pulse of FIG. 36B from the horizontal oscillation circuit 402. The frequency multiplier 415 consists of a voltage control oscillator 415A, ÷n counter 415B and phase comparator 415C, which collectively constitute a phase-locked loop. The count ratio n is a value determined according to the degree of resolution in the scanning direction of a screen. The output signal of FIG. 36C from the first frequency multiplier 415 is conducted to a sampling pulse generator 417 as well as to a recording clock pulse generator 418 to provide a sampling pulse of FIG. 36D and a recording clock pulse of FIG. 36E respectively. The recording clock pulse is controlled by a gate pulse of FIG. 36F generated from the flip-flop circuit 22 triggered by a horizontal oscillation pulse (FIG. 36B) and is supplied alternately to the first and second analogue memories 412 and 413 through the transfer gates 420 and 421 respectively per period of linear horizontal scanning. An image signal supplied to the terminal 410 is delivered to the sample hold circuit 411. The image signal is held by the sampling pulse of FIG. 36D in said circuit 411 and carried to the first and second analogue memories 412 and 413. The image signal is recorded by the recording clock pulse of FIG. 36E alternately in the first analogue memory 412 as shown in FIG. 36G and in the second analogue memory 413 as shown in FIG. 36H respectively per period of linear horizontal scanning.

On the other hand, the second frequency multiplier 416 generates a pulse signal haing a frequency n times that of the horizontal oscillation pulse of FIG. 36B. The output pulse signal from the second frequency multiplier 416 is the same as the output pulse signal of FIG. 36C from the first frequency multiplier 415 in that the pulse is generated in a number of *n* per period of horizontal scanning but is different from that of the first frequency multiplier 415 in that the output pulse signal from the second multiplier 416 is already subjected to frequency modulation by a distortion correction signal. Namely, a distortion correction signal detected by the distortion correction signal-detecting circuit 423 in accordance with the degree of the nonlinear distortion of deflection current or voltage or a distortion correction signal of FIG. 36I produced by the correction function signal generator 424 to correct the distortion of an image resulting from the cathode ray tube and deflector thereof is mixed with an output signal from the phase comparator 416C by the mixer 416D, an output from which controls the frequency of the voltage control oscillator 416A. Thus is obtained a pulse signal of FIG. 36J having its frequency modulated by the aforesaid distortion correction signal of FIG. 36I during the period of linear horizontal scanning. The pulse signal of FIG. 36J is supplied to the read out clock pulse generator 419 to provide a readout clock pulse of FIG. 36K for reading out image signals previously stored in the first and second analogue memories per period of linear horizontal scanning while compressing or extending said stored image signal in terms of time. The readout clock pulse is controlled by the gate pulse of FIG. 36F and supplied through the transfer gates 420 and 421 alternately to the first and second analogue memories 412 and 413 respectively per period of linear horizontal scanning. An image signal of FIG. 36L is drawn out from the first analogue memory 412 and an image signal of FIG. 36M from the second analogue memory 413. These image signals are conducted to the transfer gate 414, which is controlled by the gate pulse of FIG. 36F and supplied with an image signal of FIG. 36N. This image signal of FIG. 36N represents the input image signal of FIG. 36A compressed or extended in terms of time so as to correct the distortion of an image in accordance with the degree of said distortion. The image signal of FIG. 36N is properly amplified by the image signal amplifier 425 and then conducted to the cathode ray tube 407 so as to effect the superposition of separate images.

In the foregoing embodiment, memory consisted of an analogue shift register such as a bucket brigade device. However, the memory may consist of a digital memory, for example, a digital shift register. In the latter case, it is necessary to provide an A-D converter on the input side of the memory and a D-A converter on the output side thereof. Further, the first and second memories should respectively have a capacity to store $n \times 3$ bits for the 3-bit coding (eight levels).

Referring to the arrangement of the embodiment of FIG. 35, exchange between the first and second frequency multipliers 415 and 416 attains the same effect.

It will be noted that the apparatus of this invention permits the additional correction of the traveling course of electron beams appearing in the prior art apparatus.

The foregoing description refers to the case where correction of distortion was carried out with respect to an image signal drawn out from the memory. However, said correction may be made before an image signal is stored in the memory. In the latter case, it is advised to control the time at which a sampling pulse is supplied to the sample hold circuit 411. Control of said time may be effected so as to correct the distortion of an image by compressing, extending or delaying an image signal in terms of time in accordance with the degree of said distortion. It is possible to store the corrected image signal in the memory and, further as in the foregoing embodiment, repeat said correction so as to attain the compensation of the image signal. If the image signal is in a satisfactory condition, it will be only required to read out the image signal as it is and control electron beams, for example, carry out their modulation by the readout image signal.

What we claim is:

1. A color television receiver comprising an in-line type color cathode ray tube including:

a vacuum vessel having a neck portion and an enlarged portion, a fluorescent screen formed on the enlarged portion of said vacuum vessel and three electron guns provided in the neck portion of said vacuum vessel for emitting a center electron beam and two side electron beams, said electron guns being arranged in-line in the scanning direction of said center and two side electron beams;

a deflection means mounted on the neck portion of said vacuum vessel for scanning said electron beams on said fluorescent screen;

means for generating red, green and blue video signals for modulating said center and two side electron beams; and signal processing means including first means for subjecting a video signal for modulating the center beam to a fixed delay, and second means coupled to said generating means for electrically processing two video signals which are coupled to modulate said side electron beams, said second means varying a time dependent electrical characteristic of said two video signals by different amounts during a horizontal scanning period, said characteristic being varied symmetrically with respect to both the preceding and succeeding scanning time relative to a center point of said horizontal scanning period.

2. A colour television receiver according to claim 1 wherein said signal processing means comprises a variable delay line.

3. A colour television receiver according to claim 1 wherein said signal processing means comprises an analogue shift register.

4. A colour television receiver according to claim 1 wherein said signal processing means comprises a divided type discontinuous delay line.

5. A colour television receiver according to claim 1 wherein said signal processing means comprises a memory device adapted to store a video signal.

6. A colour television receiver according to claim 1 wherein said three electron guns are arranged at an angle so that the cross-point of the axes of said three electron guns is located on the outside of said fluorescent screen.

7. A colour television receiver according to claim 1 wherein said signal processing means is combined with deflection means which functions such that when three electron beams are caused to scan the fluorescent screen without being processed, said three electron beams will coincide with reference to the raster scanning line, whereas with respect to a line at right angles to the scanning line, the spacings between said three electron beams will be equal from the upper edge to the lower edge of the picture image.

8. A colour television receiver according to claim 1 wherein said signal processing means converges the distortions of a picture image in addition to composing three-colour pictures.

9. A color television receiver according to claim 1 wherein said second means of said signal processing means comprises delay means for delaying said video signals.

10. A color television receiver according to claim 9 wherein said second means of said signal processing means further includes signal compression means for compressing at least one of said red, green and blue video signals.

11. A color television receiver according to claim 10 wherein said second means of said signal processing means further includes signal expansion means for expanding at least one of said red, green and blue video signals.

12. A color television receiver according to claim 1 wherein said second means of said signal processing means includes signal compression means for compressing video signals.

13. A color television receiver according to claim 12 wherein said second means of said signal processing means further includes signal expansion means for expanding at least one of said red, green and blue video signals.

14. A color television receiver according to claim 1 wherein said second means of said signal processing means includes expansion means for expanding video signals.

15. A color television receiver according to claim 1 wherein said signal processing means includes delay means for delaying at least one of said red, green and blue video signals.

* * * * *

UNITED STATES PATENT OFFICE

CERTIFICATE OF CORRECTION

PATENT NO. 3,893,174

DATED July 1, 1975

INVENTOR(S) Shunichi SANO, et al

It is certified that error appears in the above identified patent and that said Letters Patent are hereby corrected as shown below In the heading of the patent, on the initial page thereof, beside the title "[75] Inventors:" after "both of Japan;" delete "Harry C. Murphy, Jr., Apollo; Harry C. Stauffer, Cheswick, both of Pa.";

Under the heading "[30] Foreign Application Priority Data", after the last line thereof add the following:

--December 21, 1972 Japan.........47-127718

March 8, 1973 Japan.........48-26580--.

Signed and Sealed this

*eleventh* Day of *November 1975*

[SEAL]

*Attest:*

RUTH C. MASON
*Attesting Officer*

C. MARSHALL DANN
*Commissioner of Patents and Trademarks*